(12) United States Patent
Browning et al.

(10) Patent No.: US 10,678,262 B2
(45) Date of Patent: Jun. 9, 2020

(54) AUTONOMOUS VEHICLE LOCALIZATION USING IMAGE ANALYSIS AND MANIPULATION

(71) Applicant: UATC, LLC, San Francisco, CA (US)

(72) Inventors: Brett Browning, Pittsburgh, PA (US); Peter Hansen, Pittsburgh, PA (US); Ethan Eade, Pittsburgh, PA (US); David Prasser, Pittsburgh, PA (US); David LaRose, Pittsburgh, PA (US); Robert Zlot, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 0 days.

(21) Appl. No.: 15/640,340

(22) Filed: Jun. 30, 2017

(65) Prior Publication Data

US 2018/0005050 A1    Jan. 4, 2018

Related U.S. Application Data

(60) Provisional application No. 62/412,041, filed on Oct. 24, 2016, provisional application No. 62/357,903, filed on Jul. 1, 2016.

(51) Int. Cl.
   *G05D 1/02*    (2006.01)
   *G05D 1/00*    (2006.01)
   (Continued)

(52) U.S. Cl.
   CPC ......... *G05D 1/0274* (2013.01); *B60W 30/095* (2013.01); *G01C 21/28* (2013.01); *G01C 21/32* (2013.01); *G01C 21/3602* (2013.01); *G05D 1/0088* (2013.01); *G05D 1/024* (2013.01); *G05D 1/0212* (2013.01); *G05D 1/0231* (2013.01); *G05D 1/0246* (2013.01); *G05D 1/0251* (2013.01); *G05D 1/0276* (2013.01); *G06K 9/00791* (2013.01); *G06K 9/00798* (2013.01);
   (Continued)

(58) Field of Classification Search
   USPC ........................................................ 701/445
   See application file for complete search history.

(56) References Cited

U.S. PATENT DOCUMENTS 5,144,685 A * 9/1992 Nasar .................. G05D 1/0246
                                                       348/119
5,751,852 A    5/1998 Marimont
                 (Continued)

FOREIGN PATENT DOCUMENTS

CN    102390370    3/2012
CN    202394343    8/2012
         (Continued)

OTHER PUBLICATIONS

"Ansari, Nirwan, Delp, Edward, Partial Shape Recognition: A Landmark-Based Approach, 1989, IEEE" (Year: 1989).*
(Continued)

*Primary Examiner* — Rami Khatib
(74) *Attorney, Agent, or Firm* — Dority & Manning, P.A.

(57) ABSTRACT

A system to use submaps to control operation of a vehicle is disclosed. A storage system may be provided with a vehicle to store a collection of submaps that represent a geographic area where the vehicle may be driven. A programmatic interface may be provided to receive submaps and submap updates independently of other submaps.

15 Claims, 13 Drawing Sheets

(51) Int. Cl.

| | | |
|---|---|---|
| *G01C 21/32* | (2006.01) | |
| *H04L 29/08* | (2006.01) | |
| *G01C 21/28* | (2006.01) | |
| *G06K 9/00* | (2006.01) | |
| *G06T 7/70* | (2017.01) | |
| *G01C 21/36* | (2006.01) | |
| *G06K 9/62* | (2006.01) | |
| *B60W 30/095* | (2012.01) | |
| *G06T 7/33* | (2017.01) | |

(52) U.S. Cl.
CPC .............. *G06K 9/6202* (2013.01); *G06T 7/33* (2017.01); *G06T 7/70* (2017.01); *H04L 67/18* (2013.01); *G06T 2207/10012* (2013.01); *G06T 2207/30252* (2013.01); *H04L 67/12* (2013.01)

(56) References Cited

U.S. PATENT DOCUMENTS

| | | |
|---|---|---|
| 5,809,179 A | 9/1998 | Marimont |
| 5,864,214 A | 1/1999 | Brodsky |
| 6,023,655 A | 2/2000 | Nomura |
| 6,385,539 B1 | 5/2002 | Wilson |
| 6,542,111 B1 | 4/2003 | Wilson |
| 6,795,031 B1 | 9/2004 | Walker |
| 7,102,496 B1 | 9/2006 | Ernst, Jr. |
| 7,103,496 B2 | 9/2006 | Hong |
| 7,124,027 B1 | 10/2006 | Ernst, Jr. |
| 7,783,403 B2 | 8/2010 | Breed |
| 7,994,465 B1 | 8/2011 | Bamji |
| 8,145,402 B2 | 3/2012 | Craig |
| 8,245,516 B2 | 8/2012 | Song |
| 8,253,799 B2 | 8/2012 | Elangovan |
| 8,364,334 B2 | 1/2013 | Au |
| 8,412,449 B2 | 4/2013 | Trepagnier |
| 8,521,352 B1 | 8/2013 | Ferguson |
| 8,559,673 B2 | 10/2013 | Fairfield |
| 8,676,430 B1 | 3/2014 | Ferguson |
| 8,825,265 B1 | 9/2014 | Ferguson |
| 8,917,190 B1 | 12/2014 | Melvin |
| 9,036,865 B2 * | 5/2015 | Haas .......................... G06T 7/74 382/103 |
| 9,045,041 B2 | 6/2015 | Dorum |
| 9,097,800 B1 | 8/2015 | Zhu |
| 9,139,204 B1 | 9/2015 | Zhao |
| 9,140,792 B2 | 9/2015 | Zeng |
| 9,145,140 B2 | 9/2015 | Ferguson |
| 9,158,980 B1 | 10/2015 | Ferguson |
| 9,223,013 B2 | 12/2015 | Stein |
| 9,330,321 B2 | 5/2016 | Schamp |
| 9,383,753 B1 | 7/2016 | Templeton |
| 9,386,230 B1 | 7/2016 | Duran |
| 9,442,487 B1 | 9/2016 | Ferguson |
| 9,459,625 B1 | 10/2016 | Ferguson |
| 9,488,483 B2 | 11/2016 | Ranganathan |
| 9,494,439 B1 | 11/2016 | Ross |
| 9,507,346 B1 | 11/2016 | Levinson |
| 9,552,564 B1 | 1/2017 | Martenis |
| 9,631,933 B1 | 4/2017 | Aula |
| 9,672,446 B1 * | 6/2017 | Vallespi-Gonzalez ........................ G06K 9/6267 |
| 9,672,734 B1 | 6/2017 | Ratnasingam |
| 9,683,928 B2 | 6/2017 | Swanson |
| 9,701,239 B2 | 7/2017 | Kentley |
| 9,719,801 B1 | 8/2017 | Ferguson et al. |
| 9,739,881 B1 | 8/2017 | Pavek |
| 9,840,256 B1 | 12/2017 | Valois |
| 9,841,763 B1 | 12/2017 | Valois |
| 9,863,928 B1 | 1/2018 | Peterson |
| 9,902,403 B2 | 2/2018 | Donnelly |
| 9,904,375 B1 | 2/2018 | Donnelly |
| 9,914,458 B2 | 3/2018 | Sato |
| 9,916,703 B2 | 3/2018 | Levinson |
| 9,953,535 B1 | 4/2018 | Canavor |
| 10,002,156 B2 | 6/2018 | Lublinsky |
| 10,036,639 B1 | 7/2018 | Cox |
| 10,094,672 B2 | 10/2018 | Utsugi |
| 2002/0109610 A1 | 8/2002 | Katz |
| 2002/0161501 A1 | 10/2002 | Dulin |
| 2003/0001509 A1 | 1/2003 | Leleve |
| 2003/0040944 A1 | 2/2003 | Hileman |
| 2003/0151547 A1 | 8/2003 | Mauro |
| 2004/0085227 A1 | 5/2004 | Mikuriya |
| 2004/0133330 A1 | 7/2004 | Ono |
| 2004/0204812 A1 | 10/2004 | Tran |
| 2005/0010350 A1 | 1/2005 | Hiwatashi |
| 2005/0044944 A1 | 3/2005 | Kogure |
| 2005/0100207 A1 | 5/2005 | Konolige |
| 2005/0113999 A1 | 5/2005 | Tange |
| 2005/0155685 A1 | 7/2005 | Daval |
| 2005/0222744 A1 | 10/2005 | Sakata |
| 2006/0002586 A1 | 1/2006 | Aggarwal |
| 2006/0126975 A1 | 6/2006 | McKellar |
| 2006/0128087 A1 | 6/2006 | Bamji |
| 2006/0208911 A1 | 9/2006 | Davis |
| 2006/0217882 A1 | 9/2006 | Takashima |
| 2006/0223637 A1 | 10/2006 | Rosenberg |
| 2006/0259225 A1 | 11/2006 | Ono |
| 2007/0050121 A1 | 3/2007 | Ammon |
| 2007/0229490 A1 | 10/2007 | Boudreau |
| 2007/0268364 A1 | 11/2007 | Neff |
| 2008/0033645 A1 | 2/2008 | Levinson |
| 2008/0040004 A1 | 2/2008 | Breed |
| 2008/0129475 A1 | 6/2008 | Breed |
| 2008/0162036 A1 | 7/2008 | Breed |
| 2009/0010495 A1 | 1/2009 | Schamp |
| 2009/0043439 A1 | 2/2009 | Barfoot |
| 2009/0043440 A1 | 2/2009 | Matsukawa |
| 2009/0070034 A1 | 3/2009 | Oesterling |
| 2009/0146813 A1 | 6/2009 | Nuno |
| 2009/0150036 A1 | 6/2009 | Craig |
| 2009/0005961 A1 | 8/2009 | Grabowski |
| 2009/0216600 A1 | 8/2009 | Hill |
| 2009/0228204 A1 | 9/2009 | Zavoli |
| 2009/0306859 A1 | 12/2009 | Tichy |
| 2009/0319129 A1 | 12/2009 | Ghoneim |
| 2009/0322872 A1 | 12/2009 | Muehlmann |
| 2009/0326991 A1 | 12/2009 | Wei |
| 2010/0013615 A1 | 1/2010 | Hebert |
| 2010/0020170 A1 | 1/2010 | Higgins-Luthman |
| 2010/0023213 A1 | 1/2010 | Mizuno |
| 2010/0023214 A1 | 1/2010 | Horiguchi |
| 2010/0030460 A1 | 2/2010 | Sawai |
| 2010/0165323 A1 | 7/2010 | Fiess |
| 2010/0217491 A1 | 8/2010 | Naito |
| 2010/0235083 A1 | 9/2010 | Takahata |
| 2010/0245123 A1 | 9/2010 | Prasad |
| 2010/0250052 A1 | 9/2010 | Ogino |
| 2010/0250056 A1 | 9/2010 | Perkins |
| 2010/0256836 A1 | 10/2010 | Mudalige |
| 2010/0262359 A1 | 10/2010 | Motoyama |
| 2010/0274469 A1 | 10/2010 | Takahata |
| 2010/0280751 A1 | 11/2010 | Breed |
| 2010/0295946 A1 | 11/2010 | Reed |
| 2010/0299063 A1 | 11/2010 | Nakamura |
| 2011/0012511 A1 | 1/2011 | Watanabe |
| 2011/0043377 A1 | 2/2011 | McGrath |
| 2011/0046784 A1 | 2/2011 | Anderson |
| 2011/0054791 A1 * | 3/2011 | Surampudi .......... G01C 21/005 701/472 |
| 2011/0060478 A1 | 3/2011 | Nickolaou |
| 2011/0285982 A1 | 11/2011 | Breed |
| 2012/0006610 A1 | 1/2012 | Wallace |
| 2012/0045090 A1 | 2/2012 | Bobbitt |
| 2012/0083959 A1 | 4/2012 | Dolgov |
| 2012/0121161 A1 * | 5/2012 | Eade .................... G09B 29/007 382/153 |
| 2012/0158313 A1 | 6/2012 | Wang |
| 2012/0242492 A1 | 9/2012 | Grunfeld |
| 2012/0283912 A1 | 11/2012 | Lee |
| 2012/0296539 A1 | 11/2012 | Cooprider |
| 2012/0310516 A1 * | 12/2012 | Zeng ..................... G01C 21/32 701/300 |

(56) References Cited

U.S. PATENT DOCUMENTS

| | | |
|---|---|---|
| 2012/0327410 A1 | 12/2012 | Maston |
| 2013/0015984 A1 | 1/2013 | Yamashiro |
| 2013/0018575 A1 | 1/2013 | Birken |
| 2013/0060461 A1 | 3/2013 | Wong |
| 2013/0083159 A1 | 4/2013 | Ooshima |
| 2013/0117321 A1 | 5/2013 | Fisher |
| 2013/0215115 A1 | 8/2013 | Jenkins |
| 2013/0314503 A1 | 11/2013 | Nix |
| 2013/0325279 A1 | 12/2013 | Fujimoto |
| 2014/0002277 A1 | 1/2014 | Fulger |
| 2014/0005933 A1* | 1/2014 | Fong ............ G05D 1/0274 701/447 |
| 2014/0025232 A1 | 1/2014 | Cuddihy |
| 2014/0046585 A1 | 2/2014 | Morris |
| 2014/0047250 A1 | 2/2014 | Maletsky |
| 2014/0081573 A1 | 3/2014 | Urmson |
| 2014/0118363 A1 | 5/2014 | Hakura |
| 2014/0133330 A1 | 5/2014 | Chapman |
| 2014/0136414 A1 | 5/2014 | Abhyanker |
| 2014/0188363 A1 | 7/2014 | Eckert |
| 2014/0188386 A1 | 7/2014 | Obara |
| 2014/0222298 A1 | 8/2014 | Gurin |
| 2014/0247357 A1 | 9/2014 | Sekiguchi |
| 2014/0302774 A1 | 10/2014 | Burke |
| 2014/0306835 A1 | 10/2014 | Ricci |
| 2014/0307247 A1 | 10/2014 | Zhu |
| 2014/0336842 A1 | 11/2014 | Jang |
| 2014/0336935 A1 | 11/2014 | Zhu |
| 2014/0340304 A1 | 11/2014 | Dewan |
| 2015/0003670 A1 | 1/2015 | Kuehnle |
| 2015/0035985 A1 | 2/2015 | Conneely |
| 2015/0061856 A1 | 3/2015 | Raman |
| 2015/0112585 A1 | 4/2015 | Knepper |
| 2015/0124428 A1 | 5/2015 | Hadrath |
| 2015/0142248 A1 | 5/2015 | Han |
| 2015/0166072 A1 | 6/2015 | Powers |
| 2015/0202770 A1 | 7/2015 | Patron |
| 2015/0203107 A1 | 7/2015 | Lippman |
| 2015/0210274 A1 | 7/2015 | Clark |
| 2015/0210277 A1 | 7/2015 | Ben Shalom |
| 2015/0224845 A1 | 8/2015 | Anderson |
| 2015/0247733 A1 | 9/2015 | Horihata |
| 2015/0251659 A1 | 9/2015 | Fischer |
| 2015/0266471 A1 | 9/2015 | Ferguson |
| 2015/0310146 A1 | 10/2015 | Tanzmeister |
| 2015/0331422 A1 | 11/2015 | Hartung |
| 2015/0344038 A1 | 12/2015 | Stenneth |
| 2015/0346727 A1 | 12/2015 | Ramanujam |
| 2015/0362322 A1 | 12/2015 | Ozaki |
| 2015/0369617 A1 | 12/2015 | Ding |
| 2016/0009218 A1 | 1/2016 | Nakashima |
| 2016/0016663 A1 | 1/2016 | Stanek |
| 2016/0054135 A1 | 2/2016 | Fowe |
| 2016/0055744 A1 | 2/2016 | Branson |
| 2016/0125608 A1 | 5/2016 | Sorstedt |
| 2016/0133131 A1 | 5/2016 | Grimm |
| 2016/0167582 A1 | 6/2016 | Chen |
| 2016/0176408 A1 | 6/2016 | Lynch |
| 2016/0178802 A1 | 6/2016 | Stainvas Olshansky |
| 2016/0180171 A1 | 6/2016 | Kamata |
| 2016/0207537 A1 | 7/2016 | Urano |
| 2016/0267720 A1 | 9/2016 | Mandella |
| 2016/0276131 A1 | 9/2016 | Platzgummer |
| 2016/0349063 A1 | 12/2016 | Maurer |
| 2016/0357188 A1 | 12/2016 | Ansari |
| 2016/0368504 A1 | 12/2016 | Kieren |
| 2016/0370191 A1 | 12/2016 | Utsugi |
| 2017/0008521 A1 | 1/2017 | Braunstein |
| 2017/0008522 A1 | 1/2017 | Sato |
| 2017/0015317 A1 | 1/2017 | Fasola |
| 2017/0015318 A1 | 1/2017 | Scofield |
| 2017/0016731 A1 | 1/2017 | Koshiba |
| 2017/0023659 A1 | 1/2017 | Bruemmer |
| 2017/0059336 A1 | 3/2017 | Huang |
| 2017/0090478 A1 | 3/2017 | Blayvas |
| 2017/0120814 A1 | 5/2017 | Duran |
| 2017/0123421 A1 | 5/2017 | Kentley |
| 2017/0123429 A1 | 5/2017 | Levinson |
| 2017/0124781 A1 | 5/2017 | Douillard |
| 2017/0126975 A1 | 5/2017 | Duran |
| 2017/0146991 A1 | 5/2017 | Parekh |
| 2017/0168489 A1 | 6/2017 | Rander |
| 2017/0172290 A1 | 6/2017 | Sampaio |
| 2017/0174194 A1 | 6/2017 | Baumgaertner |
| 2017/0193826 A1 | 7/2017 | Marueli |
| 2017/0227647 A1 | 8/2017 | Baik |
| 2017/0229029 A1 | 8/2017 | Klinger |
| 2017/0243073 A1 | 8/2017 | Raghu et al. |
| 2017/0248963 A1 | 8/2017 | Levinson |
| 2017/0255966 A1 | 9/2017 | Khoury |
| 2017/0262709 A1 | 9/2017 | Wellington |
| 2017/0270361 A1 | 9/2017 | Puttagunta |
| 2017/0307763 A1 | 10/2017 | Browning |
| 2017/0309172 A1 | 10/2017 | Linder |
| 2017/0313324 A1 | 11/2017 | Kumai |
| 2017/0315229 A1 | 11/2017 | Pavek |
| 2017/0316333 A1 | 11/2017 | Levinson |
| 2017/0316696 A1 | 11/2017 | Bartel |
| 2017/0345400 A1 | 11/2017 | Li |
| 2017/0351261 A1 | 12/2017 | Levinson |
| 2017/0351984 A1 | 12/2017 | Rasheed |
| 2017/0357669 A1 | 12/2017 | Offenhaeuser |
| 2017/0358204 A1 | 12/2017 | Modica |
| 2018/0003511 A1 | 1/2018 | Browning |
| 2018/0004225 A1 | 1/2018 | Milstein |
| 2018/0004226 A1 | 1/2018 | Milstein |
| 2018/0045519 A1* | 2/2018 | Ghadiok ............ G01C 21/28 |
| 2018/0060778 A1 | 3/2018 | Guo |
| 2018/0061242 A1 | 3/2018 | Bavar |
| 2018/0143639 A1 | 5/2018 | Singhal |
| 2018/0164119 A1 | 6/2018 | Becker |
| 2018/0189578 A1 | 7/2018 | Yang |
| 2018/0304891 A1 | 10/2018 | Heidenreich |

FOREIGN PATENT DOCUMENTS

| | | |
|---|---|---|
| CN | 103370249 | 10/2013 |
| CN | 104601648 | 5/2015 |
| DE | 102014114438 | 4/2015 |
| EP | 3032458 | 6/2016 |
| JP | H08334365 | 12/1996 |
| JP | H 08334365 | 3/2005 |
| JP | 2005/115911 | 4/2005 |
| JP | 2005-115911 | 4/2005 |
| JP | 2006/159939 | 6/2006 |
| JP | 2006-159939 | 6/2006 |
| JP | 2008-027239 | 2/2008 |
| JP | 2008/027239 | 2/2008 |
| JP | 2008-262459 | 10/2008 |
| JP | 2008/262459 | 10/2008 |
| JP | 2009-075756 | 4/2009 |
| JP | 2009/075756 | 4/2009 |
| JP | 2012-127861 | 7/2012 |
| JP | 2012/127861 | 7/2012 |
| JP | 2015-007874 | 1/2015 |
| JP | 2015/007874 | 1/2015 |
| KR | 100862561 | 10/2008 |
| RU | 2400592 | 9/2010 |
| RU | 132393 | 9/2013 |
| WO | WO 2001/065454 | 9/2001 |
| WO | WO2001/065454 | 9/2001 |
| WO | WO2011/038018 | 3/2011 |
| WO | WO 2011/038018 | 3/2011 |
| WO | WO 2011/055978 | 5/2011 |
| WO | WO 2011055978 | 5/2011 |
| WO | WO2013/155661 | 10/2013 |
| WO | WO 2013155661 | 10/2013 |
| WO | WO2014/072972 | 5/2014 |
| WO | WO 2014072972 | 5/2014 |
| WO | WO2014/108267 | 7/2014 |
| WO | WO 2014108267 | 7/2014 |
| WO | WO2014/131400 | 9/2014 |

(56) References Cited

FOREIGN PATENT DOCUMENTS

WO    WO 2014/147361    9/2014
WO    WO 2014131400     9/2014

OTHER PUBLICATIONS

ISR in PCT/US2017/040532 dated Jan. 11, 2018.
ISR and WO in PCT/US2017/046796 dated Feb. 28, 2018.
ISR and Written Opinion in PCT/US2017/056277 dated Apr. 5, 2018.
Azim et al., "Layer-Based Supervised Classification of Moving Objects in Outdoor Dynamic Environment Using 3D Laser Scanner", IEEE Intelligent Vehicle Symposium, Jun. 8-11, 2014, Dearborn, Michigan, 7 pages.
Erjavec, Jack, "Automotive Technology: A Systems Approach", Delmar Cengage Learning, Clifton Park, New York, 2014, pp. 616-620, 647-651, 664-668.
Extended European Search Report for European Application No. 16793475.1, dated Sep. 18, 2018, 14 pages.
Extended European Search report for European Application No. 17169669.3, dated Sep. 13, 2017, 10 pages.
Held, Gilbert, "Inter- and Intra- Vehicle Communications", Auerbach Publications, Boca Raton Florida, 2007, Chapter 1, pp. 41-50, Chapter 3.
Hrabar, et al., "3D Path Planning and Stereo-Based Obstacle Avoidance for Rotorcraft UAVs" IEEE Conference on Intelligent Robots and Systems, Sep. 22-26, Nice, France, 2008, 8 pages.
International Search Report and Written Opinion for Application No. PCT/US2016/066235, dated Mar. 3, 2017, 46 pages.
Office Action for Chinese Application No. 201680040538.2, dated Sep. 10, 2018, 38 pages.
Office Action for Chinese Application No. 20170311393.1, dated Nov. 12, 2018, 29 pages.
Office Action for European Application No. 17169669.3, dated Jun. 18, 2018, 7 pages.
Ros et al., "Vision-Based Offline-Online Perception Paradigm for Autonomous Driving", IEEE Winter Conference on Applications of Computer Vision, 8 pages.
Winner, Hermann, "Handbuch Fahrerassistanzsystem: Grundlagen, Komponenten und Systeme fur Aktive Sicherheit und Komfort", Apr. 20, 2015, Springer, 132 pages.
Ansari, Partial Shape Recognition: IEEE 1989, A Landmark-Based Approach, CH2809-2/89/000-0831, 6 pags.

Azim et al., "Layer-Based Supervised Classification of Moving Objects in Outdoor Dynamic Environment Using 3D Laser Scanner", IEEE Intelligent Vehicles Symposium Proceedings, Jun. 8, 2014, pp. 1408-1414.
Erjavec, Jack, "Automotive Technology: A Systems Approach", Feb. 21, 2014, Delmar Cengage Learning, XP055506654, ISBN 978-1-133-61231-5, p. 616-620, 647-651, 664-668.
Held, Gilbert, Inter- and Intra- Vehicle Communications 1st Edition, Nov. 8, 2007, Auerbach Publications, XP055503113, ISBN 978-1-4200-5221-3, Chapter 1, pp. 41-50, Chapter 3.
Hrabar et al., "An Evaluation of Stereo and Laser-Based Range Sensing for Rotorcraft Unmanned Aerial Vehicle Obstacle Avoidance", Journal of Field Robotics, vol. 29, No. 2, Oct. 18, 2011, 25 pages.
Hrabar et al., "3D Path Planning and Stereo-Based Obstacle Avoidance for Rotorcraft UAVs" Intelligent Robots and Systems, IEEE International Conference on intelligent Robots and Systems, Sep. 22, 2008, 8 pages.
Ros et al., "Vision-Based Offline-Online Perception Paradigm for Autonomous Driving", IEEE Winter Conference on Applications of Computer Vision, Jan. 5, 2015, 8 pages.
Serna et al., "Detection, Segmentation and Classification of 3D Urban Objects Using Mathematical Morphology and Supervised Learning", ISPRS Journal of Photogrammetry and Remote Sensing, vol. 93, Jul. 1, 2014, Amsterdam, Netherlands, pp. 243-255.
Extended European Search Report for Application No. EP16793475.1 dated Sep. 21, 2018, 14 pages.
Extended European Search Report for Application No. EP17169669.3 dated Sep. 13, 2019, 10 pages.
International Search Report and Written Opinion for Application No. PCT/US2016/066235 dated Mar. 27, 2017, 46 pages.
International Search Report and Written Opinion for Application No. PCT/US2016/031929 dated Aug. 17, 2016, 12 pages.
International Search Report and Written Opinion for Application No. PCT/US2017/046796 dated Feb. 28, 2018, 7 pages.
International Search Report and Written Opinion for Application No. PCT/US2017/056277 dated Apr. 5, 2018, 7 pages.
International Search Report and Written Opinion for Application No. PCT/US2017/040532 dated Jan. 11, 2018, 16 pages.
International Preliminary Report on Patentability for Application No. PCT/US2016/066235 dated Jun. 21, 2018, 42 pages.
Office Action for CN201680040538.2 dated Sep. 10, 2018, 38 pages.
Office Action for CN201710311393.1 dated Nov. 12, 2018, 29 pages.
Office Action for EP 17169669.3, dated Jun. 18, 2018, 7 pages.

* cited by examiner

AUTONOMOUS VEHICLE LOCALIZATION USING IMAGE ANALYSIS AND MANIPULATION

RELATED APPLICATIONS

This application claims benefit of priority to Provisional U.S. Patent Application No. 62/412,041, filed on Oct. 24, 2016; and to Provisional U.S. Patent Application No. 62/357,903, filed on Jul. 1, 2016; each of the aforementioned priority applications being hereby incorporated by reference in their respective entirety.

TECHNICAL FIELD

Examples described herein relate to a submap system for autonomously operating vehicles.

BACKGROUND

Vehicles are increasingly implementing autonomous control. Many human-driven vehicles, for example, have modes in which the vehicle can follow in a lane and change lanes.

Fully autonomous vehicles refer to vehicles which can replace human drivers with sensors and computer-implemented intelligence, sensors and other automation technology. Under existing technology, autonomous vehicles can readily handle driving with other vehicles on roadways such as highways.

Autonomous vehicles, whether human-driven hybrids or fully autonomous, operate using data that provides a machine understanding of their surrounding area.

DETAILED DESCRIPTION

Figure 1:
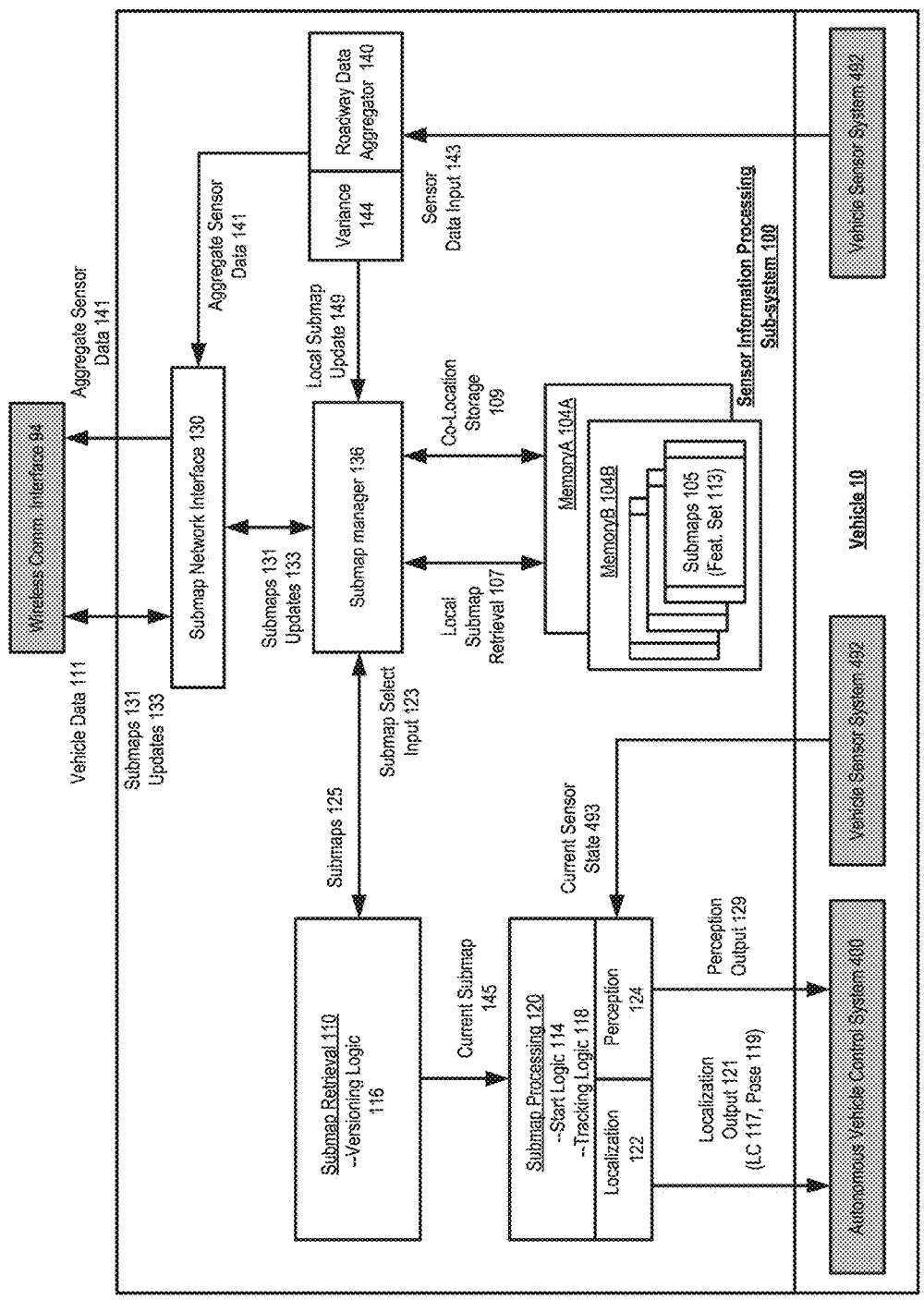
FIG. 1 illustrates an example map system for enabling autonomous control and operation of a vehicle.

Examples herein describe a system to use submaps to control operation of a vehicle. A storage system may be provided with a vehicle to store a collection of submaps that represent a geographic area where the vehicle may be driven. A programmatic interface may be provided to receive submaps and submap updates independently of other submaps.

As referred to herein, a submap is a map-based data structure that represents a geographic area of a road segment, with data sets that are computer-readable to facilitate autonomous control and operation of a vehicle. In some examples, a submap may include different types of data components that collectively provide a vehicle with information that is descriptive of a corresponding road segment. In some examples, a submap can include data that enables a vehicle to traverse a given road segment in a manner that is predictive or responsive to events which can otherwise result in collisions, or otherwise affect the safety of people or property. Still further, in some examples, a submap provides a data structure that can carry one or more data layers which fulfill a data consumption requirement of a vehicle when the vehicle is autonomously navigated through an area of a road segment. The data layers of the submap can include, or may be based on, sensor information collected from a same or different vehicle (or other source) which passed through the same area on one or more prior instances.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Numerous examples are referenced herein in context of an autonomous vehicle. An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle. Such vehicles often are required to make advance determinations regarding how the vehicle is behave given challenging surroundings of the vehicle environment.

MAP System

FIG. 1 illustrates an example map system for enabling autonomous control and operation of a vehicle. In an example of FIG. 1, a submap information processing system ("SIPS 100") may utilize submaps which individually represent a corresponding road segment of a road network. By way of example, each submap can represent a segment of a roadway that may encompass a block, or a number of city blocks (e.g., 2-5 city blocks). Each submap may carry multiple types of data sets, representing known information and attributes of an area surrounding the corresponding road segment. The SIPS 100 may be implemented as part of a control system for a vehicle 10 that is capable of autonomous driving. In this way, the SIPS 100 can be implemented to enable the vehicle 10, operating under autonomous control, to obtain known attributes and information for an area of a road segment. The known attributes and information, which are additive to the identification of the road network within the submap, enable the vehicle 10 to responsively and safely navigate through the corresponding road segment.

Among other utilities, the SIPS 100 can provide input for an autonomous vehicle control system 400 (see FIG. 4), in order to enable the vehicle 10 to operate and (i) plan/implement a trajectory or route through a road segment based on prior knowledge about the road segment, (ii) process sensor input about the surrounding area of the vehicle with understanding about what types of objects are present, (iii) detect events which can result in potential harm to the vehicle, or persons in the area, and/or (iv) detect and record conditions which can affect other vehicles (autonomous or not) passing through the same road segment. In variations, other types of functionality can also be implemented with use of submaps. For example, in some variations, individual submaps can also carry data for enabling the vehicle 10 to drive under different driving conditions (e.g., weather variations, time of day variations, traffic variations, etc.).

In some examples, the vehicle 10 can locally store a collection of stored submaps 105 which are relevant to a geographic region that the vehicle 10 is anticipated to traverse during a given time period (e.g., later in trip, following day, etc.). The collection of stored submaps 105 may be retrieved from, for example, a submap network service 200 (see FIG. 2) that maintains and updates a larger library of submaps for multiple vehicles (or user-vehicles).

With respect to the vehicle 10, each of the stored submaps 105 can represent an area of a road network, corresponding to a segment of the road network and its surrounding area. As described with some examples, individual submaps may include a collection of data sets that represent an area of the road segment within a geographic region (e.g., city, or portion thereof). Furthermore, each of the submap 105 can include data sets (sometimes referred to as data layers) to enable an autonomous vehicle 10 to perform operations such as localization, as well as detection and recognition of dynamic objects.

In an example of FIG. 1, the SIPS 100 includes a submap retrieval component 110, a submap processing component 120, a submap network interface 130, a submap manager 136, and roadway data aggregation processes 140. As the SIPS 100 may be implemented as part of the AV control system 400, the SIPS 100 may utilize or incorporate resources of the vehicle 10, including processing and memory resources, as well as sensor devices of the vehicle (e.g., Lidar, stereoscopic and/or depth cameras, video feed sonar, radar, etc.). In some examples, the SIPS 100 employs the submap network interface 130, in connection with the submap network service 200 (FIG. 2), to receive new or replacement submaps 131 and/or submap updates 133. In some examples, the submap network interface 130 can utilize one or more wireless communication interfaces 94 of the vehicle 10 in order to wireless communicate with the submap network service 200 (e.g., see FIG. 2) and receive new or replacement submaps 131 and/or submap updates 133. In variations, the submap network interface 130 can receive new or replacement submaps 131 and/or submap updates 133 from other remote sources, such as other vehicles.

In addition to receiving the new or replacement submaps 131 and submap updates 133, the submap network interface 130 can communicate vehicle data 111 to the submap network service 200. The vehicle data 111 can include, for example, the vehicle location and/or vehicle identifier.

The submap manager 136 can receive the new or replacement submaps 131 and/or submap updates 133, and create a stored collection of submaps 105 utilizing an appropriate memory component 104A, 104B. In some examples, the submaps have a relatively large data size, and the vehicle 10 retrieves the new submaps 131 when such submaps are needed. The submap network interface 130 can also receive submap updates 133 for individual submaps, or groups of submaps, stored as part of the collection 105. The submap manager 136 can include processes to manage the storage, retrieval and/or updating of stored submaps 105, in connection with, for example, the submap network service 200 (see FIG. 2) and/or other submap data sources (e.g., other vehicles).

In some examples, the submap manager 136 can implement co-location storage operations 109 as a mechanism to manage the stored submaps of the collection 105 in a manner that enables the data sets of the submaps to be rapidly retrieved and utilized by an AV control system 400. In some examples, the individual submaps of the collection 105 may include a combination of rich data sets which are linked by other data elements (e.g., metadata). An example submap with organized data layers is provided with FIG. 3. Given the range in velocity of vehicle 10, and the amount of data which is collected and processed through the various sensors of the vehicle 10, examples recognize that storing the data sets of individual submaps in physical proximity to one another on the memory components 104A, 104B of the vehicle 10 can reduce memory management complexity and time lag when individual submaps of the collection 105 are locally retrieved and utilized. Examples further recognize that physically grouping individually stored submaps 105, representing adjacent or proximate geographic areas in physical proximity to one another, on respective memory components 104A, 104B of the vehicle 10 further promotes the ability of the SIPS 100 to make timely transitions from one submap to another.

In the example shown by FIG. 1, the SIPS 100 utilizes multiple memory components 104A, 104B (collectively "memory components 104"). The submap manager 136 can implement co-location storage operations 109 to store submaps 105 relating to a particular area or sub-region of a road network on only one of the memory components 104. In variations, the submap manager 136 can implement co-location storage operations 109 to identify memory cells of the selected memory component 104 which are adjacent or near one another for purpose of carrying data of a given submap, or data for two or more adjacent submaps.

According to some examples, the submap retrieval component 110 includes processes for performing a local search or retrieval for stored submaps 105 provided with the memory components 104. The submap retrieval component 110 can signal submap selection input 123 to the submap manager 136 in order to locally retrieve 107 one or more submaps 125 for immediate processing (e.g., sub-region for upcoming segment of trip). In some instances, examples provide that the selection input 123 can be generated from a source that provides an approximate location of the vehicle 10. In one implementation, the selection input 123 is used to retrieve an initial set of submaps 125 for a road trip of the vehicle 10. The selection input 123 may be obtained from, for example, the last known location of the vehicle prior to the vehicle being turned off in the prior use. In other variations, the selection input 123 can be obtained from a location determination component (e.g., a satellite navigation component, such as provided by a Global Navigation Satellite System (or "GNSS") type receiver) of the vehicle 10.

The submap manager 136 may respond to receiving the selection input 123 by accessing a database of the local memory components 104 where a relevant portion of the collection of submaps 105 are stored. The submap manager 136 may be responsive to the selection input 123, in order to retrieve from the local memory components 104 an initial set of submaps 125. The initial set of submaps 125 can include one or multiple submaps, each of which span a different segment of a road or road network that includes, for example, a geographic location corresponding to the selection input 123.

Each of the stored submaps 105 may include data layers corresponding to multiple types of information about a corresponding road segment. For example, submaps may include data to enable the SIPS 100 to generate a point cloud of its environment, with individual points of the cloud providing information about a specific point in three-dimensional space of the surrounding environment. In some examples, the individual points of the point cloud may include or be associated with image data that visually depict a corresponding point in three-dimensional space. Image data which forms individual points of a point cloud are referred to as "imagelets". In some examples, the imagelets of a point cloud may depict surface elements, captured through Lidar (sometimes referred to as "surfels"). Still further, in some examples, the imagelets of a point cloud may include other information, such as a surface normal (or unit vector describing orientation). As an addition or variation, the points of the point cloud may also be associated with other types of information, including semantic labels, road network information, and/or a ground layer data set. In some examples, each of the stored submaps 105 may include a feature set 113 that identifies features which are present in a surrounding area of the road segment corresponding to that submap.

The submap processing component 120 may include submap start logic 114 for scanning individual submaps of an initially retrieved submap set 125, to identify the likely submap for an initial location of the vehicle 10. In one implementation, the submap processing component 120 implements the start component 122 as a coarse or first-pass process to compare the submap feature set 113 of an initially retrieved submap against a current sensor state 493, as determined from one or more sensor interfaces or components of the vehicle's sensor system 492. The start logic 114 may perform the comparison to identify, for example, a current submap 145 of the initial set which contains the feature of a landmark detected as being present in the current sensor state 493 of the vehicle 10. Once the current submap 145 is identified, the submap processing component 120 can perform a more refined localization process using the current submap 145, in order to determine a more precise location of the vehicle 10 relative to the starting submap. In some examples, the submap processing component 120 can track the movement of the vehicle 10 in order to coordinate the retrieval and/or processing of a next submap that is to be the current submap 145, corresponding to an adjacent road segment that the vehicle traverses on during a trip.

With further reference to an example of FIG. 1, the submap retrieval component 110 can select the current submap 145 for processing by the submap processing component 120. The submap processing component 120 can process the current submap 145 contemporaneously, or near contemporaneously, with the vehicle's traversal of the corresponding road segment. The data layers provided with the current submap 145 enable the vehicle 10 to drive through the road segment in a manner that is predictive or responsive to events or conditions which are otherwise unknown.

According to some examples, the submap retrieval and processing components 110, 120 can execute to retrieve and process a series of submaps 125 in order to traverse a portion of a road network that encompasses multiple road segments. In this manner, each submap of the series can be processed as the current submap 145 contemporaneously with the vehicle 10 passing through the corresponding area or road segment. In some examples, the submap processing component 120 extracts, or otherwise determines the submap feature set 113 for an area of the road network that the vehicle traverses. The submap processing component 120 compares the submap feature set 113 of the current submap 145 to the current sensor state 493 as provided by the vehicle's sensor system 492. The comparison can involve, for example, performing transformations of sensor data, and/or image processing steps such as classifying and/or recognizing detected objects or portions of a scene.

As the vehicle progresses on a trip, some examples provide for the submap processing component 120 to use tracking logic 118 to maintain an approximate position of the vehicle 10 until localization is performed. The tracking logic 118 can process, for example, telemetry information (e.g., accelerometer, speedometer) of the vehicle, as well as follow on sensor data from the sensor system 492 of the vehicle, to approximate the progression and/or location of the vehicle as it passes through a given area of a submap. The tracking logic 118 can trigger and/or confirm the progression of the vehicle from, for example, one submap to another, or from one location within a submap to another location of the same submap. After a given duration of time, the submap processing component 120 can process a next submap contemporaneously with the vehicle's progression into the area represented by the next submap.

In some examples, the submap processing component 120 processes the current submap 145 to determine outputs for use with different logical elements of the AV control system 400. In one implementation, the output includes localization output 121, which can identify a precise or highly granular location of the vehicle, as well as the pose of the vehicle. In some examples, the location of the vehicle can be determined to a degree that is more granular than that which can be determined from, for example, a satellite navigation component. As an addition or variation, the output of the submap processing component 120 includes object data sets, which locate and label a set of objects detected from the comparison of the current sensor state 493 and the submap feature set 113.

According to some examples, the submap processing component 120 can include localization component 122 to perform operations for determining the localization output. The localization output 121 can be determined at discrete instances while the vehicle 10 traverses the area of the road segment corresponding to the current submap 145. The localization output 121 can include location coordinate 117 and pose 119 of the vehicle 10 relative to the current submap 145. In some examples, the localization component 122 can compare information from the current sensor state 493 (e.g., Lidar data, imagery, sonar, radar, etc.) to the feature set 113 of the current submap 145. Through sensor data comparison, the location of the vehicle 10 can be determined with specificity that is significantly more granular than what can be determined through use of a satellite navigation component. In some examples, the location coordinates 117 can specify a position of the vehicle within the reference frame of the current submap 145 to be of a magnitude that is less than 1 foot (e.g., 6 inches or even less, approximate diameter of a tire, etc.). In this way, the location coordinates 117 can pinpoint the position of the vehicle 10 both laterally and in the direction of travel. For example, for a vehicle in motion, the location coordinates 117 can identify any one or more of: (i) the specific lane the vehicle occupies, (ii) the position of the vehicle within an occupied lane (e.g., on far left side of a lane) of the vehicle, (iii) the location of the vehicle in between lanes, and/or (iv) a distance of the vehicle from a roadside boundary, such as a shoulder, sidewalk curb or parked car.

As an addition or a variation, the submap processing component 120 can include perception component 124 which provides perception output 129 representing objects that are detected (through analysis of the current sensor state 493) as being present in the area of the road network. The perception component 124 can determine the perception output to include, for example, a set of objects (e.g., dynamic objects, road features, etc.). In determining the perception output 129, the perception component 124 can compare detected objects from the current sensor state 493 with known and static objects identified with the submap feature set 113. The perception component 124 can generate the perception output 129 to identify (i) static objects which may be in the field of view, (ii) non-static objects which may be identified or tracked, (iii) an image representation of the area surrounding a vehicle with static objects removed or minimized, so that the remaining data of the current sensor state 493 is centric to dynamic objects.

In order to navigate the vehicle on a trip, the submap retrieval component 110 identifies and retrieves next submap(s) from the submap manager 136. The next submaps that are retrieved by the submap retrieval component 110 can be identified from, for example, a determined trajectory of the vehicle 10 and/or a planned or likely route of the vehicle 10. In this way, the submap retrieval component 110 can repeatedly process, during a given trip, a series of submaps to reflect a route of the vehicle over a corresponding portion of the road network. The submap processing component 120 can process the current submaps 125 from each retrieved set in order to determine localization output 121 and perception output 129 for the AV control system 400.

According to some examples, the stored submaps 105 can be individually updated, independently of other submaps of a geographic region. As a result, the SIPS 100 can manage updates to its representation of a geographic region using smaller and more manageable units of target data. For example, when conditions or events to a specific segment of the road network merit an update, the SIPS 100 can receive and implement updates to a finite set of submaps (e.g., one to three submaps, square kilometer or half-kilometer, etc.) rather than update a map representation for the larger geographic region. Additionally, the ability for the submap processing component 120 to use submaps which are independently updated allows for the vehicle 10 and/or other vehicles of the geographic region to aggregate information for enabling updates to submaps used on other vehicles.

As described with other examples, the vehicle 10 can operate as part of a group of vehicles (or user-vehicles) which utilize submaps in order to autonomously navigate through a geographic region. In cases where multiple vehicles using submaps traverse the road network of a given geographic region, some embodiments provide that individual vehicles can operate as observers for conditions and patterns from which submap features can be determined. As described with other examples, the submap network service 200 (FIG. 2) can implement a variety of processes in order to generate sensor data, labels, point cloud information and/or other data from which submap data can be generated and used to update corresponding submaps. For a given geographic region, different submaps can be updated based on events, changing environmental conditions (e.g. weather) and/or refinements to existing models or submap feature sets.

With operation of the vehicle 10, the roadway data aggregation processes 140 can receive and aggregate sensor data input 143 from one or more vehicle sensor sources (shown collectively as vehicle sensor system 492). The sensor data input 143 can, for example, originate in raw or processed form from sensors of the vehicle 10, or alternatively, from sensor components of the vehicle which process the raw sensor data. The roadway data aggregation processes 140 can process and aggregate the sensor data input 143 to generate aggregated sensor data 141. The aggregated sensor data 141 may be generated in accordance with a protocol, which can specify raw data processing steps (e.g., filtering, refinements), data aggregation, conditions for synchronous or asynchronous (e.g., offline) transmissions of aggregated sensor data 141 and/or other aspects of sensor data aggregation, storage, and transmission.

In one implementation, the aggregate sensor data 141 can be transmitted to the submap network service 200 via the wireless communication interface 94 of the vehicle 10. In variations, the aggregate sensor data 141 can be used to generate local updates for one or more stored submaps 105. In some variations, the roadway data aggregation processes 140 can collect sensor data input 143, and perform, for example, variance analysis using variance logic 144. The variance logic 144 may be used to generate a local submap update 149, which can be used to update a corresponding submap of the collection 105 via the submap manager 136.

While examples provide for submaps to be independently updated, examples further recognize that updates to submaps can make the use of such submaps incompatible with other submaps. For example, if one submap is of a given area is updated while an adjacent submap is not, then the submap processing component 120 may not able to transition from one submap to the adjacent submap. By way of example, the update for the submap may cause the submap processing component 120 to process the submap using an algorithm or logic that is different than what was previously used. In some examples, the submap processing component 120 can be updated in connection with updates to submaps that are received and processed on that vehicle. For example, new submaps 131 received by the submap network interface 130 may include instructions, code, or triggers that are executable by the SIPS 100 (e.g., by the submap manager 136) to cause the vehicle 10 to retrieve or implement a particular logic from which the submap is subsequently processed.

According to some examples, the new submaps 131 retrieved from the submap network service 200 (or other remote source) are versioned to reflect what submap updates are present on the particular submap. In some examples, an update to a given submap can affect a particular type of data set or data layer on the submap. Still further, in other variations, the update to the submap can be programmatic (e.g., alter an algorithm used to process a data layer of the submap) or specific to data sets used by processes which consume the data layer of the submap.

Still further, in some variations, the submap retrieval component 110 may include versioning logic 116 which identifies the version of the submap (e.g., from the UID of the submap) and then retrieves a next submap that is of the same or compatible version. As described with other examples, the new submaps 131 of the collection can be structured to include connector data sets 308 (see FIG. 3) which enables the vehicle to stitch consecutive submaps together as the vehicle 10 progresses through a road network.

Submap Network Service

Figure 2:
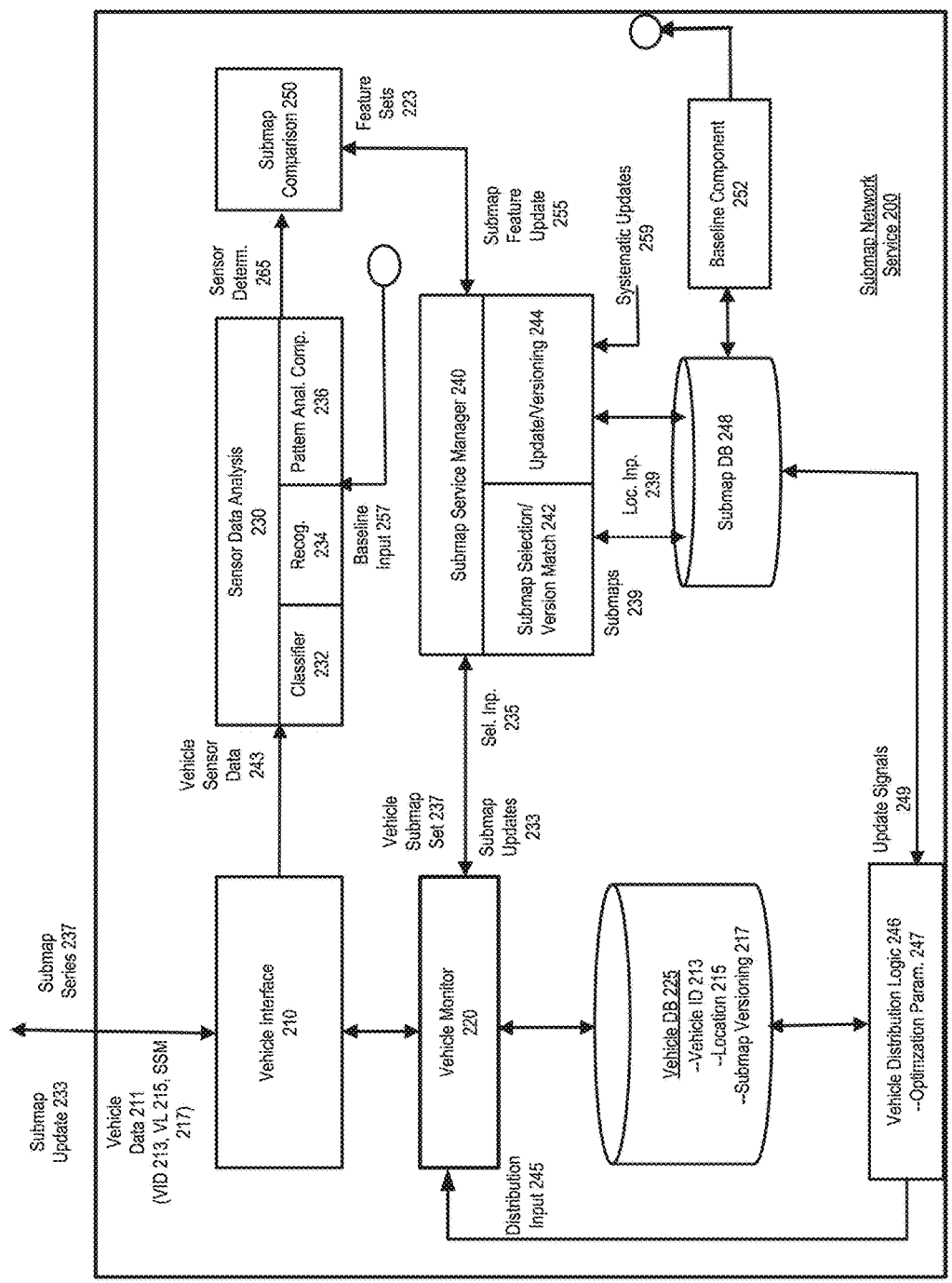
FIG. 2 illustrates a submap network service, according to one or more embodiments.

FIG. 2 illustrates a submap network service, according to one or more embodiments. In one implementation, the submap network service 200 can be implemented on a server, or combination of servers, which communicate with network enabled vehicles that traverse a road network of a geographic region. In a variation, the submap network service 200 can be implemented in alternative computing environments, such as a distributed environment. For example, some or all of the functionality described may implemented on a vehicle, or combination of vehicles, which collectively form a mesh or peer network. In some examples, a group of vehicles, in operation within a geographic region, may implement a mesh network, or peer-to-peer network, to transmit and receive data, including submaps and data for creating or updating submaps.

In an example of FIG. 2, the submap network service 200 includes a vehicle interface 210, a vehicle monitor 220, a sensor data analysis sub-system 230 and a submap service manager 240. The vehicle interface 210 provides the network interface that can communicate with one or multiple vehicles in a given geographic region. In some implementations, the vehicle interface 210 receives communications, which include vehicle data 211, from individual vehicles that wirelessly communicate with the submap network service 200 during their respective operations. The vehicle monitor 220 can receive, store and manage various forms of vehicle data 211, including a vehicle identifier 213, a vehicle location 215, and a current submap version 217 for each vehicle. The vehicle data 211 can be stored in, for example, vehicle database 225.

According to some examples, the vehicle monitor 220 manages the transmission of new submaps 231 and submap updates 233 to vehicles of the geographic region. The vehicle monitor 220 retrieves a set of submaps 237 for individual vehicles 10 from the submap service manager 240. In one implementation, the vehicle monitor 220 retrieve separate sets of submaps 237 for different vehicles, based on the vehicle data 211 stored in the vehicle database 225. For example, the vehicle monitor 220 can retrieve a submap set 237 for a given vehicle using the vehicle identifier 213, the vehicle location 215 associated with the vehicle identifier, and/or the current submap version 217 for the vehicle identifier.

The submap service manager 240 can manage storage and retrieval of individual submaps 239 from a submap database 248. One or multiple submap sources can create submaps and/or update individual submap stored in the submap database 248 or similar memory structure. The submap service manager 240 can include a submap selection and version matching component 242 that can select sets of submaps 237 for individual vehicles of a geographic region. The submap selection/version matching component 242 can select sets of submaps 237 for individual vehicles, based on the vehicle location 215 and the vehicle submap version 217. In response to receiving the vehicle location 215, for example, the submap selection/version matching component 242 may search the submap database 248 to identify submaps for the geographic region of the vehicle, having a same or compatible submap version.

To retrieve a submap for a vehicle 10, the vehicle monitor 220 may communicate selection input 235 (based on or corresponding to the vehicle location 215) for the vehicle, as well as other information which would enable the submap service manager 240 to select the correct submap and version for the vehicle at the given location. For example, the vehicle database 225 can associate a vehicle identifier with the submap version of the vehicle 10. In variations, the vehicle 10 can communicate its submap version when requesting submaps from the submap network service 200.

The submap service manager 240 can initiate return of a new set of submaps 237 for a given submap request of a vehicle. The new submap sets 237 can be selected from the submap database 248 and communicated to a specific vehicle via the vehicle interface 210. For example, individual vehicles 10 may carry (e.g., locally store and use) a limited set of submaps, such as submaps which the vehicle is likely to need over a given duration of time. But if the vehicle traverses the geographic region such that submaps for other localities are needed, the vehicle 10 may request additional submaps from the submap network service 200, and then receive the new submap sets 237 based on the vehicle's potential range.

In some variations, the submap network service 200 also generates submap updates 233 for vehicles of the geographic region. The submap updates 233 for a given submap may correspond to any one of an updated submap, an updated data layer or component of the submap, or a data differential representing the update to a particular submap. As described in greater detail, the submap update 233 to a given submap may result in a new submap version.

According to some examples, the submap network service 200 can include submap distribution logic 246 to interface with the submap database 248. The submap distribution logic 246 may receive update signals 249 signifying when new submap sets 237 and/or submap updates 233 are generated. The submap distribution logic 246 can trigger the vehicle monitor 220 to retrieve new submap sets 237 and/or submap updates 233 from the submap database 248 based on distribution input 245 communicated from the submap distribution logic 246. The distribution input 245 can identify vehicles by vehicle identifier 213, by class (e.g., vehicles which last received updates more than one week prior) or other designation. The vehicle monitor 220 can determine the selection input 235 for a vehicle or set of vehicles based on the distribution input 245. The submap distribution logic 246 can generate the distribution input 245 to optimize distribution of updates to individual submaps of the submap database 248. The submap distribution logic 246 may also interface with the vehicle database 225 in order to determine which vehicles should receive new submap sets 237 and/or submap updates 233 based on the vehicle identifier 213, vehicle location 215 and submap version 217 associated with each vehicle. In this way, the submap distribution logic 246 can cause the distribution of new submap sets 237 and/or submap updates 233 to multiple vehicles of a given geographic region in parallel, so that multiple vehicles can receive new submap sets 237 and/or submap updates 233 according to a priority distribution that is optimized for one or more optimization parameters 247.

In one implementation, optimization parameter 247 can correspond to a proximity parameter that reflects a distance between a current location of a vehicle and an area of the road network where submaps (of different versions) have recently been updated. By way of example, the submap distribution logic 246 can utilize the optimization parameter 247 to select vehicles (or classes of vehicles) from the geographic region which is prioritized to receive updated submaps. For example, vehicles which receive the series of submap sets 237 and updates 233 can include vehicles that are expected to traverse the regions of the road network which have corresponding submap updates sooner, based on their proximity or historical pattern of use.

In variations, the optimization parameter 247 can also de-select or de-prioritize vehicles which, for example, may be too close to an area of the geographic region that corresponds to the new submap sets 237 or submap updates. For vehicles that are too close, the de-prioritization may ensure the corresponding vehicle has time to receive and implement an updated submap before the vehicle enters a corresponding area of a road network.

In variations, the optimization parameters 247 for determining selection and/or priority of vehicles receiving new submap sets 237 and/or submap updates 233. Still further, the submap distribution logic 246 can utilize the vehicle operational state to determine whether other updates are to be distributed to the vehicle. For example, larger updates (e.g., a relatively large number of new submaps) may require vehicles to be non-operational when the update is received and implemented. Thus, some examples contemplate that at least some new submap sets 237 and/or submap updates 233 can be relatively small, and received and implemented by vehicles which are in an operational state (e.g., vehicles on trip). Likewise, some examples contemplate that larger updates can be delivered to vehicles when those vehicles are in an off-state (e.g., in a low-power state by which updates can be received and implemented on the vehicle).

According to some examples, the submap network service 200 includes processes that aggregate sensor information from the vehicles that utilize the submaps, in order to determine at least some updates to submaps in use. As an addition or variation, the submap network service 200 can also receive and aggregate submap information from other sources, such as human driven vehicles, specialized sensor vehicles (whether human operated or autonomous), and/or network services (e.g., pot hole report on Internet site). The sensor data analysis 230 represents logic and processes for analyzing vehicle sensor data 243 obtained from vehicles that traverse road segments represented by the submaps of the submap database 248. With reference to FIG. 1, for example, the vehicle sensor data 243 can correspond to output of the roadway data aggregation process 140.

The sensor analysis sub-system 230 can implement processes and logic to analyze the vehicle sensor data 243, and to detect road conditions which can or should be reflected in one or more data layers of a corresponding submap. Additionally, the sensor analysis sub-system 230 can generate data sets as sensor analysis determinations 265 to modify and update the data layers of the submaps to more accurately reflect a current or recent condition of the corresponding road segment.

According to some examples, the sensor analysis sub-system 230 implements sensor analysis processes on vehicle sensor data 243 (e.g., three-dimensional depth image, stereoscopic image, video, Lidar, etc.). In one example, the sensor analysis sub-system 230 may include a classifier 232 to detect and classify objects from the vehicle sensor data 243. Additionally, the sensor analysis sub-system 230 may include an image recognition process 234 to recognize features from the sensor data for the detected objects. The classifier 232 and the image recognition process 234 can generate sensor analysis determinations 265. The sensor analysis determinations 265 can specify a classification of the detected objects, as well as features of the classified object.

Other types of sensor analysis processes may also be used. According to some examples, the sensor analysis sub-system 230 includes pattern analysis component 236 which implements pattern analysis on aggregations of sensor analysis determinations 265 for a particular road segment or area. In some examples, the vehicle data 211 links the vehicle sensor data 243 to one or more localization coordinate 117 (see FIG. 1), so that the vehicle sensor data 243 is associated with a precise location. The pattern analysis component 236 can process the vehicle sensor data 243 of multiple vehicles, for a common area (as which may be defined by the localization coordinate 117 communicated by the individual vehicles) and over a defined duration of time (e.g., specific hours of a day, specific days of a week, etc.). The sensor analysis determinations 265 can be aggregated, and used to train models that are capable of recognizing objects in sensor data, particularly with respect to geographic regions and/or lighting conditions. Still further, the processes of the sensor analysis sub-system 230 can be aggregated to detect temporal or transient conditions, such as time of day when traffic conditions arise. As described with some other examples, the sensor analysis determinations 265 can include object detection regarding the formation of instantaneous road conditions (e.g., new road hazard), as well as pattern detection regarding traffic behavior (e.g., lane formation, turn restrictions in traffic intersections, etc.).

Accordingly, the sensor analysis determinations 265 of the sensor analysis sub-system 230 can include classified objects, recognized features, and traffic patterns. In order to optimize analysis, some variations utilize the feature set 223 of a corresponding submap for an area of a road network that is under analysis.

In some examples, a baseline component 252 can extract baseline input 257 from the submap of an area from which aggregated sensor analysis data is being analyzed. The baseline input 257 can include or correspond to the feature set 223 of the submaps associated with the area of the road network. The baseline component 252 can extract, or otherwise identify the baseline input 257 as, for example, a coarse depiction of the road surface, static objects and/or landmarks of the area of the submap. The baseline input 257 can provide a basis for the sensor data analysis 230 to perform classification and recognition, and to identify new and noteworthy objects and conditions.

As an addition or variation, the submap comparison component 250 includes processes and logic which can compare sensor analysis determinations 265 of the sensor analysis sub-system 230, with the feature sets 223 of the corresponding submaps for the area of a road network. For example, the submap comparison component 250 can recognize when a classified and/or recognized object/feature output from the sensor analysis sub-system 230 is new or different as compared to the feature set 223 of the same submap. The submap comparison component 250 can compare, for example, objects and features of the vehicle's scene, as well as road surface conditions/features and/or lighting conditions, in order to generate a submap feature update 255 for the corresponding submap.

The update and versioning component 244 of the submap service manager 240 can implement processes to write the updates to the submap database 248 for the corresponding submap. Additionally, the update and versioning component 244 can implement versioning for an updated submap so that a given submap is consistent with submaps of adjacent areas before such submaps are transmitted to the vehicles. In order to version a given submap, some examples provide for the update and versioning component 244 to create a copy of the submap to which changes are made, so that two or more versions of a given submap exist in the submap database 248. This allows for different vehicles to carry different versions of submaps, so that updates to submaps are not required to be distributed to all vehicles at once, but rather can be rolled out progressively, according to logic that can optimize bandwidth, network resources and vehicle availability to receive the updates.

When submaps are updated to carry additional or new data reflecting a change in the area represented by the submap, the change may be discrete to reflect only one, or a specific number of submaps. In some variations, however, the submap feature update 255 can affect other submaps, such as adjacent submaps (e.g., lane detour). Additionally, the update and versioning component 244 can receive submap systematic updates 259 from external sources. The submap systematic updates 259 may affect submap by class, requiring replacement of submaps or re-derivation of data layers. For example, the systematic updates 259 may require vehicles to implement specific algorithms or protocols in order to process a data layer of the submap. In some examples, the versioning component 244 can also configure the submaps to carry program files, and/or data to enable vehicles to locate and implement program files, for purpose of processing the updated submaps.

When systematic updates occur to a group or collection of submaps, the update and versioning component 244 can create new submap versions for a collection or group of submaps at a time, so that vehicles can receive sets of new submaps 237 which are updated and versioned to be compatible with the vehicle (e.g., when the vehicle is also updated to process the submap) and with each other. The update and versioning component 244 can, for example, ensure that the new (and updated) submaps 237 can be stitched by the vehicles into routes that the respective vehicles can use to traverse a road network for a given geographic region, before such updated submaps are communicated to the vehicles.

Submap Data Aggregation

Figure 3:
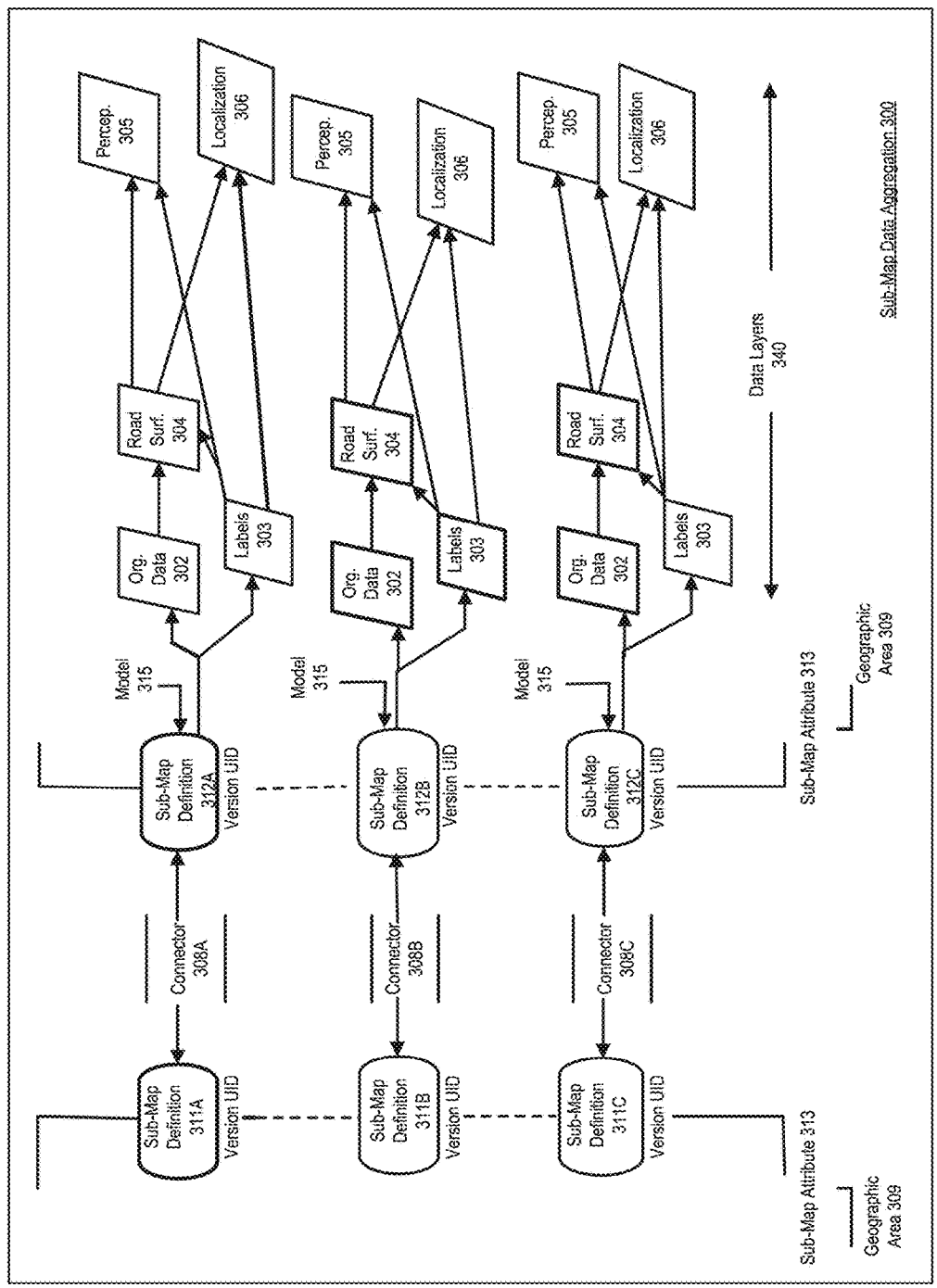
FIG. 3 illustrates a submap data aggregation that stores and links multiple versions of submaps, collectively representing linked roadway segments for a geographic region, according to one or more examples.

FIG. 3 illustrates a submap data aggregation that stores and links multiple versions of submaps, collectively representing linked roadway segments for a geographic region, according to one or more examples. In FIG. 3, a submap data aggregation 300 may be implemented as, for example, the collection of stored submaps 105 on an autonomous vehicle 10, as described with an example of FIG. 1. With further reference to an example of FIG. 3, the submap data aggregation 300 may logically structure submaps to include a submap definition 311, 312, as well as one or more data layers 340 which can provide information items such as submap feature set 113 (see FIG. 1). Among other benefits, the submap data aggregation 300 enables the submap associated with a given road segment to be updated independent of updates to submaps for adjacent road segments. In one example, individual road segments of a road network can be represented by multiple versions of a same submap (e.g., as defined for a particular road segment), with each version including an update or variation that is not present with other versions of the same submap.

According to some examples, each submap definition 311, 312 can include an association or grouping of data sets (e.g., files in a folder, table with rows and columns, etc.) which collectively identify to a road segment. Each submap definition 311, 312 may also correlate to a submap version and a submap geographic coordinate set, such as to define the geometric boundary of the submap. The data sets that are associated or grouped to a particular submap may include a semantic label layer 303, a road surface layer 304, a perception layer 305 and a localization layer 306. The type of data layers which are recited as being included with individual submaps serve as examples only. Accordingly, variations to examples described may include more or fewer data layers, as well as data layers of alternative types.

The submap data aggregation 300 of a road segment may be processed by, for example, the submap processing component 120 contemporaneously with the vehicle 10 traversing a corresponding portion of the road segment. The various data layers of individual submaps are processed to facilitate, for example, the AV control system 400 in understanding the road segment and the surrounding area. According to examples, the localization layer 306 includes sensor data, such as imagelets (as captured by, for example, stereoscopic cameras of the vehicle 10) arranged in a three-dimensional point cloud, to represent the view of a given scene at any one of multiple possible positions within the submap. The localization layer 306 may thus include data items that are stored as raw or processed image data, in order to provide a point of comparison for the localization component 122 of the submap processing component 110.

With reference to an example of FIG. 1, the localization component 122 may use the localization layer 306 to perform localization, in order to determine a pinpoint or highly granular location, along with a pose of the vehicle at a given moment in time. According to some examples, the localization layer 306 may provide a three-dimensional point cloud of imagelets and/or surfels. Depending on the implementation, the imagelets or surfels may represent imagery captured through Lidar, stereoscopic cameras, a combination of two-dimensional cameras and depth sensors, or other three-dimensional sensing technology. In some examples, the localization component 122 can determine precise location and pose for the vehicle by comparing image data, as provided from the current sensor state 93 of the vehicle, with the three-dimensional point cloud of the localization layer 306.

In some examples, the perception layer 305 can include image data, labels or other data sets which mark static or persistent objects. With reference to an example of FIG. 1, the perception component 124 may use the perception layer 305 to subtract objects identified through the perception layer 305 from a scene as depicted by the current sensor state 493 (see FIG. 1). In this way, the submap processing component 120 can use the perception layer 305 to detect dynamic objects. Among other operations, the vehicle 10 can use the perception layer 305 to detect dynamic objects for purpose of avoiding collisions and/or planning trajectories within a road segment of the particular submap.

The road surface layer 304 can include, for example, sensor data representations and/or semantic labels that are descriptive of the road surface. The road surface layer 304 can identify, for example, the structure and orientation of the roadway, the lanes of the roadway, and the presence of obstacles which may have previously been detected on the roadway, predictions of traffic flow patterns, trajectory recommendations and/or various other kinds of information.

The label layer 303 can identify semantic labels for the roadway and area surrounding the road segment of the submap. This may include labels that identify actions needed for following signage or traffic flow.

The individual submaps 311, 312 may also include organization data 302, which can identify a hierarchy or dependency as between individual data layers of the submap. For example, in some examples, the localization layer 306 and the perception layer 305 may be dependent on the road surface layer 304, as the data provided by the respective localization and perception layers 306, 305 would be dependent on, for example, a condition of the road surface.

In an example of FIG. 3, the submap versions for a common road segment are distinguished through lettering (312A-312C). Each submap version may be distinguished from other versions by, for example, the processing logic to be used with the submap, the submap data structure (e.g., the interdependencies of the data layers), the format of the data layers, and/or the contents of the respective data layers. In some examples, each submap 311, 312 may utilize models, algorithms, or other logic (shown as model 315) in connection with processing data for each of the data layers. The logic utilized to process data layers within a submap may differ. Additionally, different logic may be utilized for processing data layers of the submap for different purposes. Accordingly, the data layers of the individual submaps may be formatted and/or structured so as to be optimized for specific logic.

According to some examples, the structure of the submap data aggregation 300 permits individual submaps to be updated independent of other submaps (e.g., submaps of adjacent road segments). For example, individual submaps for a geographic region can be updated selectively based on factors such as the occurrence of events which affect one submap over another. When submaps are updated, the submap in its entirety may be replaced by an updated submap. As an addition or variation, components of the submap (e.g., a data layer) can be modified or replaced independent of other components of the submap. The updating of the submap can change, for example, information conveyed in one or more data layers (e.g., perception layer 305 reflects a new building, road surface layer 304 identifies road construction, etc.), the structure or format of the data layers (e.g., such as to accommodate new or updated logic of the vehicle 10 for processing the data layer), the organizational data (e.g., a submap may alter the perception layer 305 to be dependent on the localization layer 306), or the type and availability of data layers (e.g., more or fewer types of semantic labels for the label layer 303).

According to some examples, each submap includes an identifier that includes a versioning identifier ("versioning ID 325"). When a submap for a particular road segment is updated, a new version of a submap is created, and the identifier of the submap is changed to reflect a new version. In one implementation, the version identifier can be mapped to a record that identifies the specific component version and/or date of update. In another implementation, the versioning ID 325 is encoded to reflect the mapping of the updated submap received for that version of the submap.

The data sets that are associated or grouped to a particular submap may also include a connector data set 308 (e.g., edge) that links the particular version of the submap to a compatible version of the submap for the adjacent road segment. Each connector data set 308 may link versions for submaps of adjacent road segments using logic or encoding that identifies and matches compatible submap updates. In one implementation, the connector data sets 308 use the versioning ID 325 of the individual submaps to identify compatibility amongst adjacent submaps and versions thereof. The logic utilized in forming the connector data sets 308 can account for the type of nature of the update, such as the particular data layer or component that is updated with a particular submap version. In some examples, when the update to the submap affects, for example, an algorithm or model for determining the interdependent data sets, the versioning ID 325 can reflect compatibility with only those submaps that utilize the same algorithm or model 315. When the update to the submap affects the structure of a data layer such as localization layer 306 or perception layer 305, the versioning of the data layer may reflect, for example, that the specific submap version is compatible with multiple other submap versions which provide for the same data layer structures.

With reference to an example of FIG. 1, the connector data sets 308 may cause the submap retrieval and processing components 110, 120 to retrieve and/or process a particular submap version, based on compatibility to the current submaps 125 that are processed. In this way, a vehicle that utilizes a particular submap version can ensure that the submap of the vehicle's next road segment is of a compatible version. Among other benefits, the use of connector data sets 308 enable updates (e.g., such as from the submap network service 200) to be generated for numerous vehicles, and then distributed on a roll-out basis, based on opportunity and availability of individual vehicles to receive updates. The roll out of the submaps can be performed so that vehicles, which may receive submap updates early or late in the process, can have a series of compatible submaps for use when traversing the road network of a given region.

System Description

Figure 4:
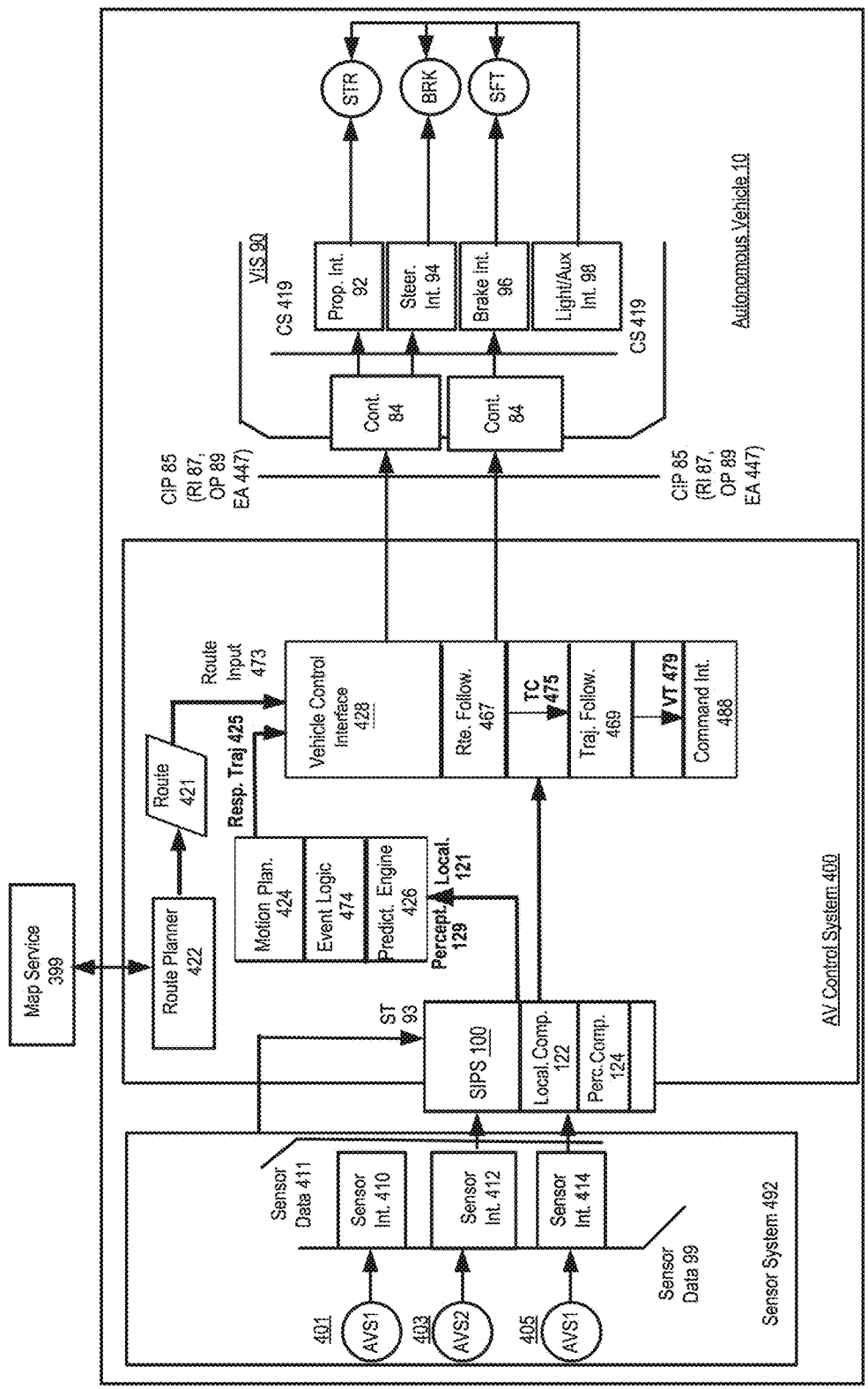
FIG. 4 illustrates an example of a control system for an autonomous vehicle.

FIG. 4 illustrates an example of a control system for an autonomous vehicle. In an example of FIG. 4, a control system 400 is used to autonomously operate a vehicle 10 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually.

In one implementation, the AV control system 400 can utilize specific sensor resources in order to intelligently operate the vehicle 10 in most common driving situations. For example, the AV control system 400 can operate the vehicle 10 by autonomously steering, accelerating and braking the vehicle 10 as the vehicle progresses to a destination.

The control system 400 can perform vehicle control actions (e.g., braking, steering, accelerating) and route planning using sensor information, as well as other inputs (e.g., transmissions from remote or local human operators, network communication from other vehicles, etc.).

In an example of FIG. 4, the AV control system 400 includes a computer or processing system which operates to process sensor data that is obtained on the vehicle with respect to a road segment that the vehicle is about to drive on. The sensor data can be used to determine actions which are to be performed by the vehicle 10 in order for the vehicle to continue on a route to a destination. In some variations, the AV control system 400 can include other functionality, such as wireless communication capabilities, to send and/or receive wireless communications with one or more remote sources. In controlling the vehicle, the AV control system 400 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

Examples recognize that urban driving environments present significant challenges to autonomous vehicles. In particular, the behavior of objects such as pedestrians, bicycles, and other vehicles can vary based on geographic region (e.g., country or city) and locality (e.g., location within a city). Additionally, examples recognize that the behavior of such objects can vary based on various other events, such as time of day, weather, local events (e.g., public event or gathering), season, and proximity of nearby features (e.g., crosswalk, building, traffic signal). Moreover, the manner in which other drivers respond to pedestrians, bicyclists and other vehicles varies by geographic region and locality.

Accordingly, examples provided herein recognize that the effectiveness of autonomous vehicles in urban settings can be limited by the limitations of autonomous vehicles in recognizing and understanding how to process or handle the numerous daily events of a congested environment.

The autonomous vehicle 10 can be equipped with multiple types of sensors 401, 403, 405, which combine to provide a computerized perception of the space and environment surrounding the vehicle 10. Likewise, the AV control system 400 can operate within the autonomous vehicle 10 to receive sensor data from the collection of sensors 401, 403, 405, and to control various electromechanical interfaces for operating the vehicle on roadways.

In more detail, the sensors 401, 403, 405 operate to collectively obtain a complete sensor view of the vehicle 10, and further to obtain information about what is near the vehicle, as well as what is near or in front of a path of travel for the vehicle. By way of example, the sensors 401, 403, 405 include multiple sets of cameras sensors 401 (video camera, stereoscopic pairs of cameras or depth perception cameras, long range cameras), remote detection sensors 403 such as provided by radar or Lidar, proximity or touch sensors 405, and/or sonar sensors (not shown).

Each of the sensors 401, 403, 405 can communicate with, or utilize a corresponding sensor interface 410, 412, 414. Each of the sensor interfaces 410, 412, 414 can include, for example, hardware and/or other logical component which is coupled or otherwise provided with the respective sensor. For example, the sensors 401, 403, 405 can include a video camera and/or stereoscopic camera set which continually generates image data of an environment of the vehicle 10. As an addition or alternative, the sensor interfaces 410, 412, 414 can include a dedicated processing resource, such as provided with a field programmable gate array ("FPGA") which receives and/or processes raw image data from the camera sensor.

In some examples, the sensor interfaces 410, 412, 414 can include logic, such as provided with hardware and/or programming, to process sensor data 99 from a respective sensor 401, 403, 405. The processed sensor data 99 can be outputted as sensor data 411. As an addition or variation, the AV control system 400 can also include logic for processing raw or pre-processed sensor data 99.

According to one implementation, the vehicle interface subsystem 90 can include or control multiple interfaces to control mechanisms of the vehicle 10. The vehicle interface subsystem 90 can include a propulsion interface 92 to electrically (or through programming) control a propulsion component (e.g., a gas pedal), a steering interface 94 for a steering mechanism, a braking interface 96 for a braking component, and lighting/auxiliary interface 98 for exterior lights of the vehicle. The vehicle interface subsystem 90 and/or control system 400 can include one or more controllers 84 which receive one or more commands 85 from the AV control system 400. The commands 85 can include route information 87 and one or more operational parameters 89 which specify an operational state of the vehicle (e.g., desired speed and pose, acceleration, etc.).

The controller(s) 84 generate control signals 419 in response to receiving the commands 85 for one or more of the vehicle interfaces 92, 94, 96, 98. The controllers 84 use the commands 85 as input to control propulsion, steering, braking and/or other vehicle behavior while the autonomous vehicle 10 follows a route. Thus, while the vehicle 10 may follow a route, the controller(s) 84 can continuously adjust and alter the movement of the vehicle in response receiving a corresponding set of commands 85 from the AV control system 400. Absent events or conditions which affect the confidence of the vehicle in safely progressing on the route, the AV control system 400 can generate additional commands 85 from which the controller(s) 84 can generate various vehicle control signals 419 for the different interfaces of the vehicle interface subsystem 90.

According to examples, the commands 85 can specify actions that are to be performed by the vehicle 10. The actions can correlate to one or multiple vehicle control mechanisms (e.g., steering mechanism, brakes, etc.). The commands 85 can specify the actions, along with attributes such as magnitude, duration, directionality or other operational characteristic of the vehicle 10. By way of example, the commands 85 generated from the AV control system 400 can specify a relative location of a road segment which the autonomous vehicle 10 is to occupy while in motion (e.g., change lanes, move to center divider or towards shoulder, turn vehicle etc.). As other examples, the commands 85 can specify a speed, a change in acceleration (or deceleration) from braking or accelerating, a turning action, or a state change of exterior lighting or other components. The controllers 84 translate the commands 85 into control signals 419 for a corresponding interface of the vehicle interface subsystem 90. The control signals 419 can take the form of electrical signals which correlate to the specified vehicle action by virtue of electrical characteristics that have attributes for magnitude, duration, frequency or pulse, or other electrical characteristics.

In an example of FIG. 4, the AV control system 400 includes SIPS 100, including localization component 122 and perception component 124. The AV control system 400 may also include route planner 422, motion planning component 424, event logic 474, prediction engine 426, and a vehicle control interface 428. The vehicle control interface 428 represents logic that communicates with the vehicle interface subsystem 90, in order to issue commands 85 that control the vehicle with respect to, for example, steering, lateral and forward/backward acceleration and other parameters. The vehicle control interface 428 may issue the commands 85 in response to determinations of various logical components of the AV control system 400.

In an example of FIG. 4, the SIPS 100 is shown as a sub-component of the AV control system 400. In variations, the components and functionality of the SIPS 100 can be distributed with other components in the vehicle. The SIPS 100 can utilize a current sensor state 93 of the vehicle 10, as provided by sensor data 411. The current sensor state 93 can include raw or processed sensor data obtained from Lidar, stereoscopic imagery, and/or depth sensors. As described with an example of FIG. 1, the SIPS 100 may provide localization output 121 (including localization coordinate 117 and pose 119, as shown with an example of FIG. 1) to one or more components of the AV control system 400. The localization output 121 can correspond to, for example, a position of the vehicle within a road segment. The localization output 121 can be specific in terms of identifying, for example, any one or more of a driving lane that the vehicle 10 is using, the vehicle's distance from an edge of the road, the vehicle's distance from the edge of the driving lane, and/or a distance of travel from a point of reference for the particular submap. In some examples, the localization output 121 can determine the relative location of the vehicle 10 within a road segment, as represented by a submap, to within less than a foot, or to less than a half foot.

Additionally, the SIPS 100 may signal perception output 129 to one or more components of the AV control system 400. The perception output 129 may utilize, for example, the perception layer 305 (see FIG. 3) to subtract objects which are deemed to be persistent from the current sensor state 93 of the vehicle. Objects which are identified through the perception component 124 can be perceived as being static or dynamic, with static objects referring to objects which are persistent or permanent in the particular geographic region. The perception component 124 may, for example, generate perception output 129 that is based on sensor data 411 which exclude predetermined static objects. The perception output 129 can correspond to interpreted sensor data, such as (i) image, sonar or other electronic sensory-based renderings of the environment, (ii) detection and classification of dynamic objects in the environment, and/or (iii) state information associated with individual objects (e.g., whether object is moving, pose of object, direction of object). The perception component 124 can interpret the sensor data 411 for a given sensor horizon. In some examples the perception component 124 can be centralized, such as residing with a processor or combination of processors in a central portion of the vehicle. In other examples, the perception component 124 can be distributed, such as onto the one or more of the sensor interfaces 410, 412, 414, such that the outputted sensor data 411 can include perceptions.

The motion planning component 424 can process input, which includes the localization output 121 and the perception output 129, in order to determine a response trajectory 425 which the vehicle may take to avoid a potential hazard. The motion planning component 424 includes logic to determine one or more trajectories, or potential trajectories of moving objects in the environment of the vehicle. When dynamic objects are detected, the motion planning component 424 determines a response trajectory 425, which can be directed to avoiding a collision with a moving object. In some examples, the response trajectory 425 can specify an adjustment to the vehicle's speed (e.g., vehicle in front slowing down) or to the vehicle's path (e.g., swerve or change lanes in response to bicyclist). The response trajectory 425 can be received by the vehicle control interface 428 in advancing the vehicle forward. In some examples, the motion planning component 424 associates a confidence value with the response trajectory 425, and the vehicle control interface 428 may implement the response trajectory 425 based on the associated confidence value. As described below, the motion planning component 424 may also characterize a potential event (e.g., by type, severity), and/or determine the likelihood that a collision or other event may occur unless a response trajectory 425 is implemented.

In some examples, the motion planning component 424 may include a prediction engine 426 to determine one or more types of predictions, which the motion planning component 424 can utilize in determining the response trajectory 425. In some examples, the prediction engine 426 may determine a likelihood that a detected dynamic object will collide with the vehicle, absent the vehicle implementing a response trajectory to avoid the collision. As another example, the prediction engine 426 can identify potential points of interference or collision by unseen or occluded objects on a portion of the road segment in front of the vehicle. The prediction engine 426 may also be used to determine a likelihood as to whether a detected dynamic object can collide or interfere with the vehicle 10.

In some examples, the motion planning component 424 includes event logic 474 to detect conditions or events, such as may be caused by weather, conditions or objects other than moving objects (e.g., potholes, debris, road surface hazard, traffic, etc.). The event logic 474 can use the vehicle's sensor state 93, localization output 121, perception output 129 and/or third-party information to detect such conditions and events. Thus, the event logic 474 detects events which, if perceived correctly, may in fact require some form of evasive action or planning. In some examples, response action 425 may include input for the vehicle to determine a new vehicle trajectory 479, or to adjust an existing vehicle trajectory 479, either to avoid or mitigate a potential hazard. By way of example, the vehicle response trajectory 425 can cause the vehicle control interface 428 to implement a slight or sharp vehicle avoidance maneuver, using a steering control mechanism and/or braking component.

The route planner 422 can determine a route 421 for a vehicle to use on a trip. In determining the route 421, the route planner 422 can utilize a map database, such as provided over a network through a map service 399. Based on input such as destination and current location (e.g., such as provided through a satellite navigation component), the route planner 422 can select one or more route segments that collectively form a path of travel for the autonomous vehicle 10 when the vehicle in on a trip. In one implementation, the route planner 422 can determine route input 473 (e.g., route segments) for a planned route 421, which in turn can be communicated to the vehicle control 428.

In an example of FIG. 4, the vehicle control interface 428 includes components to operate the vehicle on a selected route 421, and to maneuver the vehicle based on events which occur in the vehicle's relevant surroundings. The vehicle control interface 428 can include a route following component 467 to receive a route input 473 that corresponds to the selected route 421. Based at least in part on the route input 473, the route following component 467 can determine a route trajectory component 475 that corresponds to a segment of the selected route 421. A trajectory following component 469 can determine or select the vehicle's trajectory 479 based on the route trajectory 475 and input from the motion planning component 424 (e.g., response trajectory 425 when an event is detected). In a scenario where the vehicle is driving autonomously without other vehicles or objects, the route trajectory component 475 may form a sole or primary basis of the vehicle trajectory 479. When dynamic objects or events are detected for avoidance planning by the motion planning component 424, the trajectory following component 469 can select or determine an alternative trajectory based on the response trajectory 425. For example, the response trajectory 425 can provide an alternative to the route trajectory 475 for a short duration of time, until an event is avoided. The selection and/or use of the response trajectory 425 (or response trajectories) can be based on the confidence, severity and/or type of object or event detected by the motion planning component 424. Additionally, the selection and/or use of the response trajectory 425 can be weighted based on the confidence value associated with the determinations, as well as the severity, type, and/or likelihood of occurrence. The vehicle control interface 428 can include a command interface 488, which uses the vehicle trajectory 479 to generate the commands 85 as output to control components of the vehicle 10. The commands can further implement driving rules and actions based on various context and inputs.

Hardware Diagrams

Figure 5:
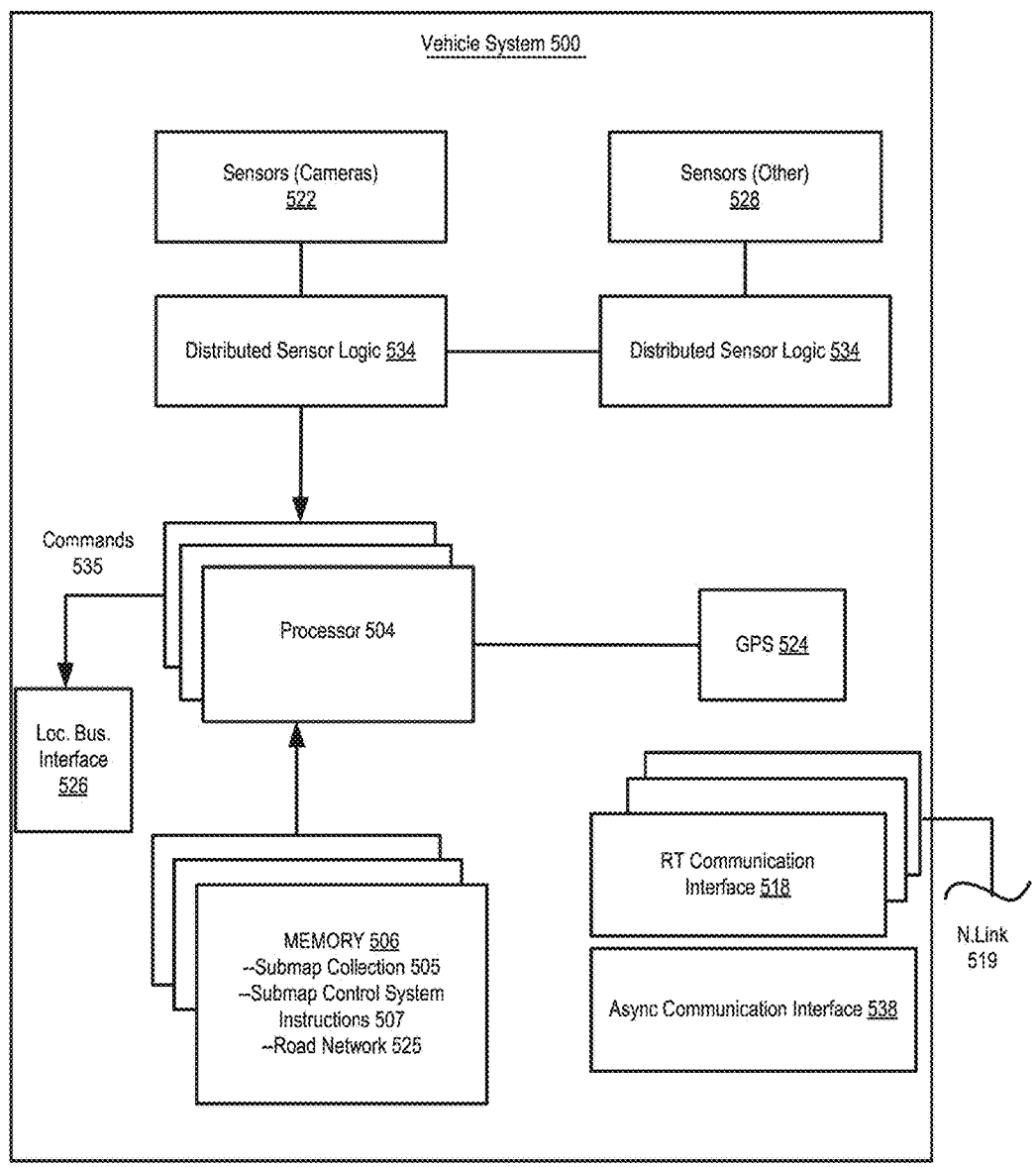
FIG. 5 is a block diagram of a vehicle system on which an autonomous vehicle control system may be implemented.

FIG. 5 is a block diagram of a vehicle system on which an autonomous vehicle control system may be implemented. According to some examples, a vehicle system 500 can be implemented using a set of processors 504, memory resources 506, multiple sensors interfaces 522, 528 (or interfaces for sensors) and location-aware hardware such as shown by satellite navigation component 524. In an example shown, the vehicle system 500 can be distributed spatially into various regions of a vehicle. For example, a processor bank 504 with accompanying memory resources 506 can be provided in a vehicle trunk. The various processing resources of the vehicle system 500 can also include distributed sensor processing components 534, which can be implemented using microprocessors or integrated circuits. In some examples, the distributed sensor logic 534 can be implemented using field-programmable gate arrays (FPGA).

In an example of FIG. 5, the vehicle system 500 further includes multiple communication interfaces, including a real-time communication interface 518 and an asynchronous communication interface 538. The various communication interfaces 518, 538 can send and receive communications to other vehicles, central services, human assistance operators, or other remote entities for a variety of purposes. In the context of FIG. 1 and FIG. 4, for example, the SIPS 100 and the AV control system 400 can be implemented using vehicle system 500, as with an example of FIG. 5. In one implementation, the real-time communication interface 518 can be optimized to communicate information instantly, in real-time to remote entities (e.g., human assistance operators). Accordingly, the real-time communication interface 518 can include hardware to enable multiple communication links, as well as logic to enable priority selection.

The vehicle system 500 can also include a local communication interface 526 (or series of local links) to vehicle interfaces and other resources of the vehicle 10. In one implementation, the local communication interface 526 provides a data bus or other local link to electro-mechanical interfaces of the vehicle, such as used to operate steering, acceleration and braking, as well as to data resources of the vehicle (e.g., vehicle processor, OBD memory, etc.). The local communication interface 526 may be used to signal commands 535 to the electro-mechanical interfaces in order to control operation of the vehicle.

The memory resources 506 can include, for example, main memory, a read-only memory (ROM), storage device, and cache resources. The main memory of memory resources 506 can include random access memory (RAM) or other dynamic storage device, for storing information and instructions which are executable by the processors 504. The processors 504 can execute instructions for processing information stored with the main memory of the memory resources 506. The main memory can also store temporary variables or other intermediate information which can be used during execution of instructions by one or more of the processors 504. The memory resources 506 can also include ROM or other static storage device for storing static information and instructions for one or more of the processors 504. The memory resources 506 can also include other forms of memory devices and components, such as a magnetic disk or optical disk, for purpose of storing information and instructions for use by one or more of the processors 504.

One or more of the communication interfaces 518 can enable the autonomous vehicle to communicate with one or more networks (e.g., cellular network) through use of a network link 519, which can be wireless or wired. The vehicle system 500 can establish and use multiple network links 519 at the same time. Using the network link 519, the vehicle system 500 can communicate with one or more remote entities, such as network services or human operators. According to some examples, the vehicle system 500 stores submaps 505, as well as submap control system instructions 507 for implementing the SIPS 100 (see FIG. 1). The vehicle system 500 may also store AV control system instructions 509 for implementing the AV control system 400 (see FIG. 4). During runtime (e.g., when the vehicle is operational), one or more of the processors 504 execute the submap processing instructions 507, including the prediction engine instructions 515, in order to implement functionality such as described with an example of FIG. 1.

In operating the autonomous vehicle 10, the one or more processors 504 can execute AC control system instructions 509 to operate the vehicle. Among other control operations, the one or more processors 504 may access data from a road network 525 in order to determine a route, immediate path forward, and information about a road segment that is to be traversed by the vehicle. The road network can be stored in the memory 506 of the vehicle and/or received responsively from an external source using one of the communication interfaces 518, 538. For example, the memory 506 can store a database of roadway information for future use, and the asynchronous communication interface 538 can repeatedly receive data to update the database (e.g., after another vehicle does a run through a road segment).

Figure 6:
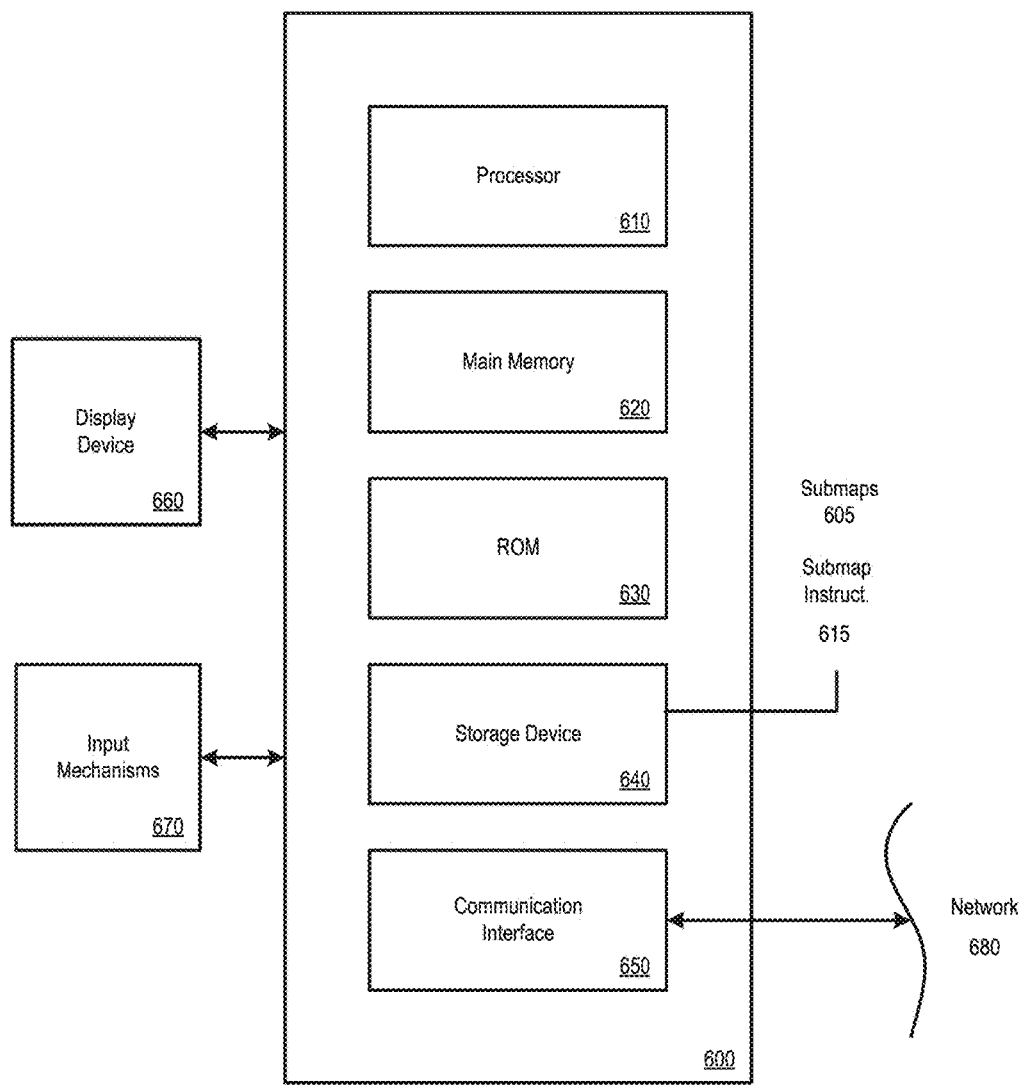
FIG. 6 is a block diagram of a network service or computer system on which some embodiments may be implemented.

FIG. 6 is a block diagram of a network service or computer system on which some embodiments may be implemented. According to some examples, a computer system 600, such as shown with an example of FIG. 2, may be used to implement a submap service or other remote computer system, such as shown with an example of FIG. 2.

In one implementation, the computer system 600 includes processing resources, such as one or more processors 610, a main memory 620, a read-only memory (ROM) 630, a storage device 640, and a communication interface 650. The computer system 600 includes at least one processor 610 for processing information and the main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. The storage device 640, such as a magnetic disk or optical disk, is provided for storing information and instructions. For example, the storage device 640 can correspond to a computer-readable medium that stores instructions for maintaining and distributing submaps to vehicles, such as described with examples of FIG. 2 and FIG. 8. In such examples, the computer system 600 can store a database of submaps 605 for a geographic region, with each submap being structured in accordance with one or more examples described below. The memory 620 may also store instructions for managing and distributing submaps ("submap instructions 615"). For a given geographic region, individual submaps 605 may represent road segments and their surrounding area. The processor 604 may execute the submap instructions 615 in order to perform any of the methods such as described with FIG. 8.

The communication interface 650 can enable the computer system 600 to communicate with one or more networks 680 (e.g., cellular network) through use of the network link (wirelessly or using a wire). Using the network link, the computer system 600 can communicate with a plurality of user-vehicles, using, for example, wireless network interfaces which may be resident on the individual vehicles.

The computer system 600 can also include a display device 660, such as a cathode ray tube (CRT), an LCD monitor, or a television set, for example, for displaying graphics and information to a user. An input mechanism 670, such as a keyboard that includes alphanumeric keys and other keys, can be coupled to the computer system 600 for communicating information and command selections to the processor 610. Other non-limiting, illustrative examples of the input mechanisms 670 include a mouse, a trackball, touch-sensitive screen, or cursor direction keys for communicating direction information and command selections to the processor 610 and for controlling cursor movement on the display 660.

Some of the examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Methodology

Figure 7:
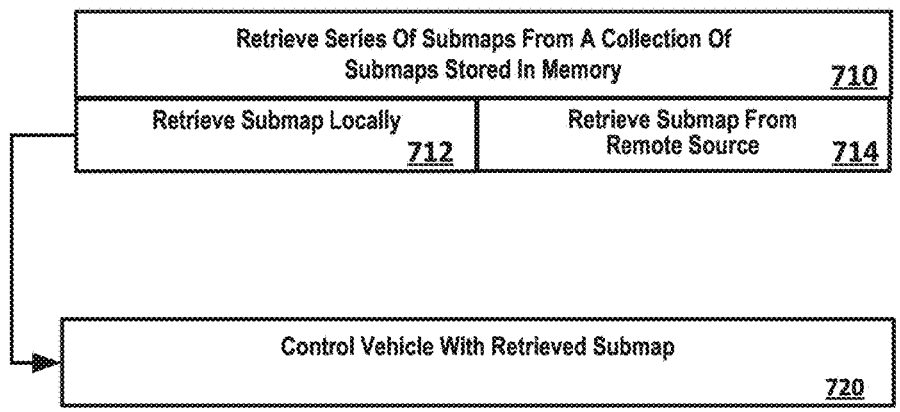
FIG. 7 illustrates an example method for operating a vehicle using a submap system, according to one or more examples.

FIG. 7 illustrates an example method for operating a vehicle using a submap system, according to one or more examples. According to examples, the method such as described with FIG. 7 may be implemented using components such as described with FIGS. 1, 4 and 5. Accordingly, in describing an example of FIG. 7, reference may be made to elements of prior examples in order to illustrate a suitable component for performing a step or sub-step being described.

In one implementation, the autonomous vehicle retrieves a series of submaps (or one or more submaps) from a collection of submaps that are stored in memory (710). The series of submaps may be retrieved for use in controlling the vehicle 10 on a trip. As described with other examples, each submap may represent an area of a road network on which the vehicle is expected to travel. According to some examples, the individual submaps of the collection can each include (i) an identifier from the collection, (ii) multiple data layers, with each data layer representing a feature set of the area of the road network of that submap, and (iii) a connector data set to link the submap with another submap that represents an adjacent area to the area of the road network of that submap. By way of example, the retrieval operation may be performed in connection with the vehicle initiating a trip. In such an example, the retrieval operation is performed to obtain submaps for the vehicle 10 prior to the vehicle progressing on the trip to the point where a submap is needed. In variations, the vehicle 10 may retrieve submaps in anticipation of use at a future interval.

In some examples, the retrieval operation is local (712). For example, the submap retrieval process 110 may retrieve submaps from a collection of submaps 105 that are stored with memory resources of the vehicle. In variations, the submap retrieval process 110 may retrieve submaps from a remote source (714), such as the submap network service 200, or another vehicle. For example, the vehicle 10 may communicate wirelessly (e.g., using a cellular channel) with the submap network service 200, or with another vehicle 10 which may have submaps to share.

The vehicle 10 can be controlled in its operations during the trip using the retrieved submaps (720). For example, the submap processing component 120 of the SIPS 100 can extract data from the various data layers of each submap, for use as input to the AV control system 400. The AV control system 400 can, for example, utilize the submap to navigate, plan trajectories, determine and classify dynamic objects, determine response actions, and perform other operations involved in driving across a segment of a road network that corresponds to a submap.

Figure 8:
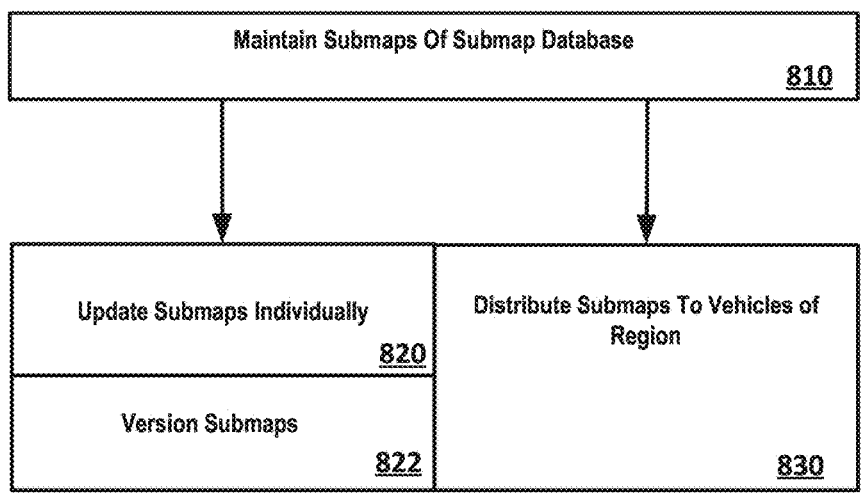
FIG. 8 illustrates an example method for distributing mapping information to vehicles of a geographic region for use in autonomous driving, according to one or more examples.

FIG. 8 illustrates an example method for distributing mapping information to vehicles of a geographic region for use in autonomous driving, according to one or more examples. A method such as described with FIG. 8 may be implemented using components such as described with FIG. 2 and FIG. 6. Accordingly, in describing an example of FIG. 7, reference may be made to elements of prior examples in order to illustrate a suitable component for performing a step or sub-step being described.

With reference to an example of FIG. 8, the submap network service 200 may maintain a series of submaps which are part of a submap database (810). In one implementation, the submap network service 200 may utilize servers and network resources to maintain a library of submaps for a geographic region.

In some variations, the submap network service 200 can update submaps individually and independent of other submaps (820). When such updates occur, the submap network service 200 can distribute updated submaps to a population of vehicles in the pertinent geographic region. Each vehicle may then receive or store an updated set of submaps. The ability to update and distribute submaps individually, apart from a larger map of the geographic region, facilitates the submap network service 200 in efficiently and rapidly managing the submap library, and the collections of submaps which can be repeatedly communicated to user-vehicles of the pertinent geographic region.

As described with examples of FIG. 1 and FIG. 3, submaps may be versioned to facilitate partial distribution to vehicles of a population (822). Versioning submaps facilitate the submap network service 200 in progressively implementing global updates to the submaps of a geographic region. Additionally, versioning submaps enables user-vehicles to operate utilizing submaps that differ by content, structure, data types, or processing algorithm.

As an addition or alternative, the submap network service 200 may distribute a series of submaps to multiple vehicles of the geographic region (830). According to some examples, the distribution of submaps may be done progressively, to vehicles individually or in small sets, rather than to all vehicles that are to receive the submaps at one time. The versioning of submaps may also facilitate the distribution of new submaps, by for example, ensuring that vehicles which receive new submaps early or late in the update process can continue to operate using compatible submap versions.

Figure 9:
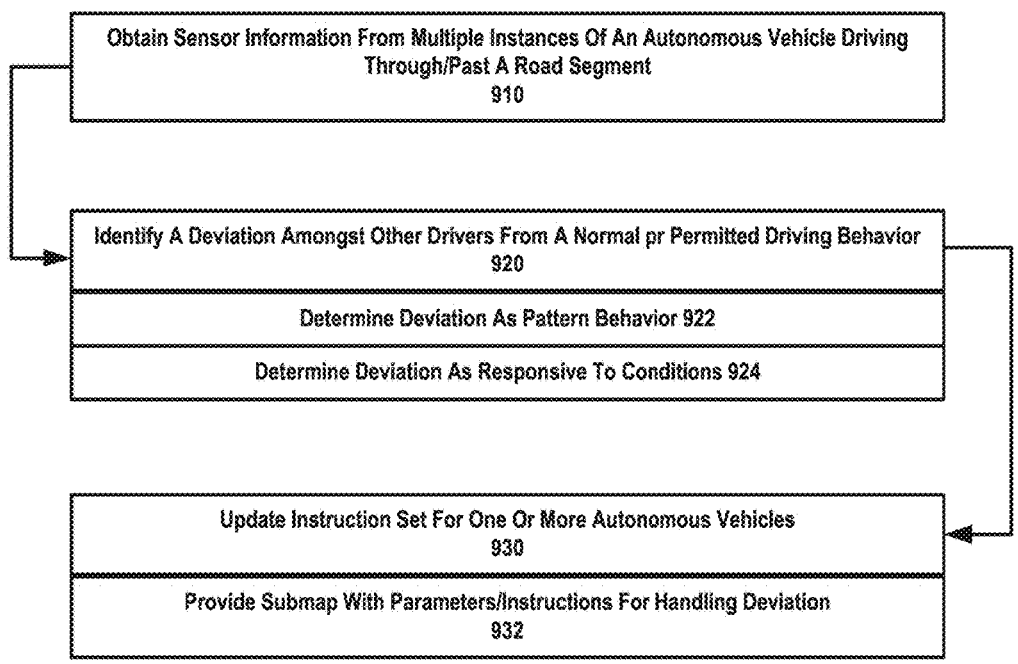
FIG. 9 illustrates an example method for providing guidance to autonomous vehicles.

FIG. 9 illustrates an example method for providing guidance to autonomous vehicles. A method such as described with an example of FIG. 9 may be implemented by, for example, a network computer system, such as described with submap network service 200 (see FIG. 2), in connection with information provided by autonomous vehicles, such as described with FIG. 1 and FIG. 4. Accordingly, reference may be made to elements of other examples for purpose of illustrating a suitable component or element for performing a step or sub-step being described.

According to an example, sensor information is obtained from multiple instances of at least one autonomous vehicle driving through or past a road segment which undergoes an event or condition that affects traffic or driving behavior (910). The autonomous vehicle 10 may, for example, be in traffic to encounter the causal condition or event. Alternatively, the autonomous vehicle 10 may capture sensor data of other vehicles that are encountering the condition or event (e.g., the autonomous vehicle may travel in an alternative direction). The sensor information may correspond to image data (e.g., two-dimensional image data, three-dimensional image data, Lidar, radar, sonar, etc.). The sensor information may be received and processed by, for example, the submap network service 200.

The submap network service may use the sensor information to identify a deviation from a normal or permitted driving behavior amongst a plurality of vehicles that utilize the road segment (920). The deviation may be identified as an aggregation of incidents, where, for example, the driving behavior of vehicles in the population deviate form a normal or permitted behavior. The past incidents can be analyzed through, for example, statistical analysis (e.g., development of histograms), so that future occurrences of the deviations may be predicted. By way of example, a deviation may correspond to an ad-hoc formation of a turn lane. In some cases, the deviation may be a technical violation of law or driving rules for the geographic region. For example, the deviation may correspond to a turn restriction that is otherwise permissible, but not feasible to perform given driving behavior of other vehicles. As another example, the deviation may correspond to a reduction ins speed as a result of traffic formation, such as by other vehicles anticipating traffic. As another example, the deviation may include the formation of a vehicle stopping space that other vehicles utilize, but which is otherwise impermissible. Alternatively, the deviation may include elimination of a vehicle parking space that is permissible, but not feasible to access given driving behavior of other vehicles.

In order to identify the deviation, the submap data analysis 230 may extract vehicle sensor data 243 transmitted form a vehicle, then plot the localization position of the vehicle to determine when and where the autonomous vehicle 10 occupied a lane that crossed a midline of the road, or a shoulder on the side of the road. As an alternative or variation, the submap data analysis 230 may perform image (or other sensor data) analysis to identify, for example, vehicles standing still or conglomerating in places of the road network to block access for turning or parking spots.

In some examples, the submap network service 200 determines the deviation as being a pattern behavior (922). The pattern behavior may be temporal, such as reoccurring on specific days of week or time.

In variations, the behavior may be responsive to certain events or conditions (924). For example, snowfall or rain may be observed to cause vehicles on a road segment to drive towards a center divider.

The instructions set for one or more autonomous vehicles may be updated to enable or facilitate the autonomous vehicles to implement the deviation (930). In some examples, the instructions may be updated by inclusion of parameters, sensor data or other information in the submap that encompasses the location of the deviation. As an addition or variation, the instructions may be updated by relaxing driving rules for the autonomous vehicle 10 to permit driving behavior which would otherwise be considered impermissible or constrained.

In some examples, the submap may include parameters or instructions to indicate when the deviation is anticipated, or when alternative driving behavior to account for the deviation is permissible (932). For example, the deviation may be patterned in time, and the submap for the vehicle may weight against the vehicle implementing the deviation unless within time slots when the driving behavior of other vehicles warrants the deviation.

Figure 10:
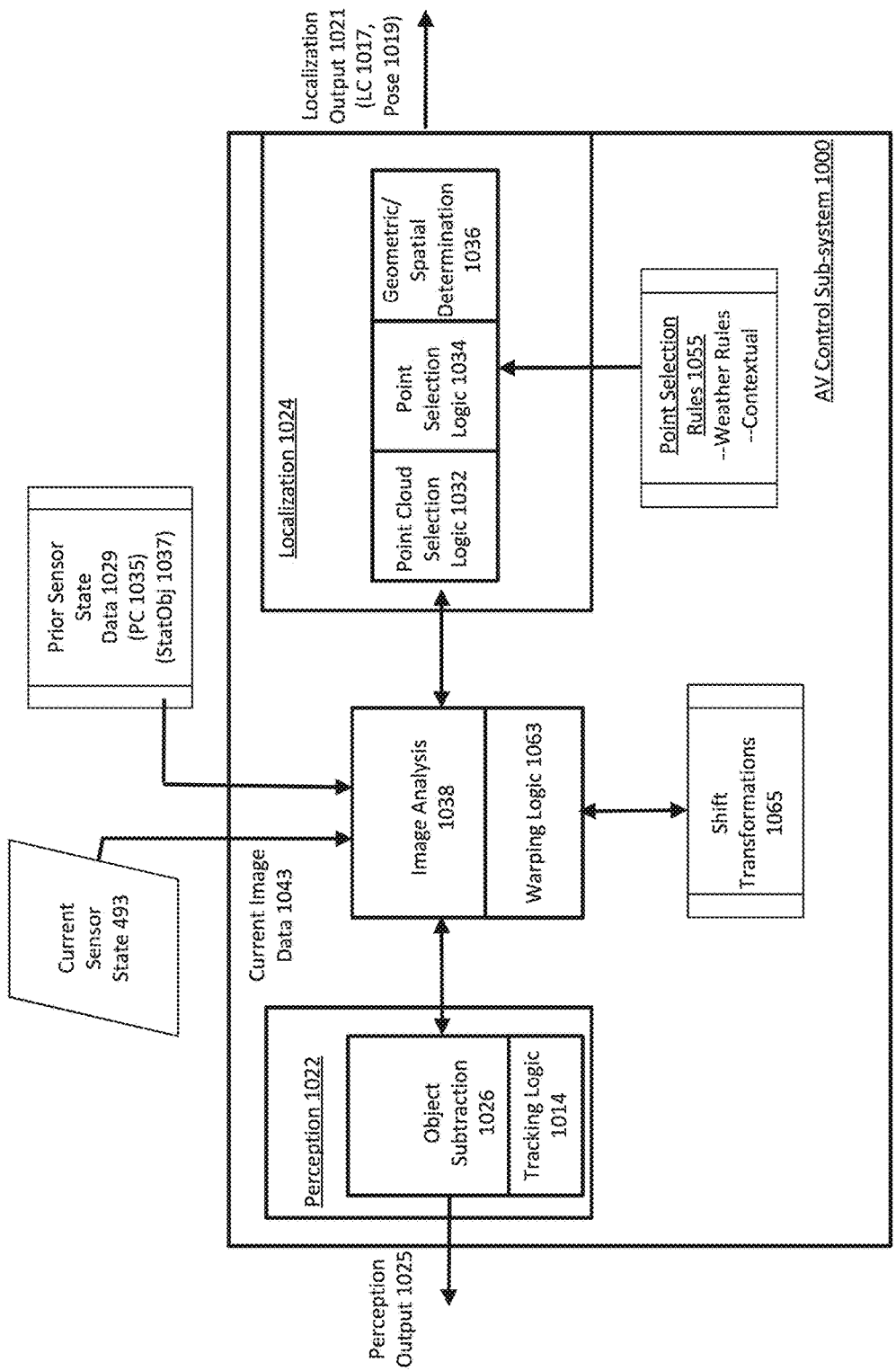
FIG. 10 illustrates an example sensor processing subsystem for an autonomous vehicle, according to one or more embodiments.

FIG. 10 illustrates an example sensor processing subsystem for an autonomous vehicle, according to one or more embodiments. According to some examples, a sensor processing sub-system 1000 may be implemented as part of an AV control system 400 (see FIG. 4). In some examples, the sensor processing subsystem 1000 can be implemented as the submap information processing system 100 (e.g., see FIGS. 1 and 4). In variations, the sensor processing subsystem 1000 may be implemented independent of submaps.

According to an example of FIG. 10, the sensor processing subsystem 1000 includes a localization component 1024, a perception component 1022, and image processing logic 1038. The localization component 1024 and/or the perception component 1022 may each utilize the image processing logic 1038 in order to determine a respective output. In particular, the localization component 1024 and the perception component 1022 may each compare current sensor state data 493, including current image data 1043 captured by onboard cameras of the vehicle, with prior sensor state data 1029. The current image data 1043 may include, for example, passive image data, such as provided with depth images generated from pairs of stereoscopic cameras and two dimensional images (e.g., long range cameras). The current image data 1043 may also include active image data, such as generated by Lidar, sonar, or radar.

In some examples such as described with FIG. 1 through FIG. 3, prior sensor state 1029 may be provided through use of submaps, which may carry or otherwise provide data layers corresponding to specific types of known sensor data sets (or features) for a given area of a road segment. In variations, prior sensor state 1029 may be stored and/or accessed in another form or data stricture, such as in connection with latitude and longitude coordinates provided by a satellite navigation component.

The localization component 1024 may determine a localization output 1021 based on comparison of the current sensor state 493 and prior sensor state 1029. The localization output 1021 may include a location coordinate 1017 and a pose 1019. In some examples, the location coordinate 1017 may be with respect to a particular submap which the vehicle 10 is deemed to be located in (e.g., such as when the vehicle 10 is on trip). The pose 1019 may also be with respect to a predefined orientation, such as the direction of the road segment.

According to some examples, the localization component 1024 determines the localization output 1021 using the prior sensor state 1029 of an area of the vehicle. The prior sensor state 1029 may be distributed as elements that reflect a sensor field of view about a specific location where the sensor data was previously obtained. When distributed about the sensor field of view, the sensor information provided by the prior sensor state 1029 can be said to be in the form of a point cloud 1035. In some examples, the point cloud 1035 of prior sensor information may be substantially two-dimensional, spanning radially (e.g., 180 degrees, 360 degrees about, for example, a reference location that is in front of the vehicle). In variations, the point cloud 1035 of prior sensor information may be three-dimensional, occupying a space in front and/or along the sides of the vehicle. Still further, in other variations, the point cloud 1035 of prior sensor information may extend in two or three dimensions behind the vehicle. For example, the prior sensor state 1029 may be provided as part of a submap that includes a layer of imagelets arranged in a point cloud. The imagelets may include, for example, passive image data sets, or image sets collected from a Lidar component of the vehicle. The individual imagelets of the prior sensor state 1029 may each be associated with a precise coordinate or position, corresponding to a location of sensor devices that captured sensor information of the prior state information. In some variations, the imagelets of prior sensor state 1029 may also reference a pose, reflecting an orientation of the sensor device that captured the prior data. In some variations, the imagelets may also be associated with labels, such as semantic labels which identify a type or nature of an object depicted in the imagelet, or a classification (e.g., imagelet depicts a static object). Still further, the imagelets may be associated with a priority or weight, reflecting, for example, a reliability or effectiveness of the imagelet for purpose of determining the localization output 1021.

In some variations, the prior sensor state 1029 may include multiple point clouds 135 for different known and successive locations of a road segment, such as provided by a submaps. For example, the prior sensor state 1029 may include a point cloud 1035 of prior sensor information for successive locations of capture, along a roadway segment, where the successive locations are an incremental distance (e.g., 1 meter) apart.

As an addition or alternative, the prior sensor state 1029 may include multiple different point clouds 1035 that reference a common location of capture, with variations amongst the point clouds 1035 accounting for different lighting conditions (e.g., lighting conditions such as provided by weather, time of day, season). In such examples, the localization component 1024 may include point cloud selection logic 1032 to select the point cloud 1035 of prior sensor information to reflect a best match with a current lighting condition, so that a subsequent comparison between the prior sensor state 1029 and the current sensor state 493 does not result in inaccuracies resulting from differences in lighting condition. For example, with passive image data, the variations amongst the point clouds 1035 of prior sensor information may account for lighting variations resulting from time of day, weather, or season.

In some examples, the point cloud selection logic 1032 may select the appropriate point cloud 1035 of prior sensor state information based on an approximate location of the vehicle 10. For example, when the vehicle 10 initiates a trip, the point cloud selection logic 1032 may select a point cloud 1035 of prior sensor information based on a last known location of the vehicle. Alternatively, the point cloud selection logic 1032 may select the point cloud 1035 of prior sensor information based on an approximate location as determined by a satellite navigation component, or through tracking of velocity and time (and optionally acceleration). As an addition or alternative, the point cloud selection logic 1032 may select the appropriate point cloud based on contextual information, which identifies or correlates to lighting conditions. Depending on implementation, the selected point cloud 1035 may carry less than 5 imagelets, less than 10 imagelets, or tens or hundreds of imagelets.

The localization component 1024 may compare the current image data 1043 of the current sensor state 493 with that of the selected point cloud 1035 in order to determine the localization output 1021. In performing the comparison, the localization component 1024 may generate, or otherwise create, a fan or field of view for the current sensor information, reflecting the scene as viewed from the vehicle at a particular location. The localization component 1024 may utilize the image processing logic 1038 to perform image analysis to match features of the scene with imagelets of the selected point cloud 1035. The localization component 1024 may use the image processing logic 1038 to match portions of the current image data 1043 with individual imagelets of the selected point cloud 1035. In some examples, multiple matching imagelets are determined for purpose of determining the localization output 1021. For example, in some examples, 3 to 5 matching imagelets are identified and then used to determine the localization output 1021. In variations, more than 10 matching imagelets are identified and used for determining the localization output 1021.

In some examples, the localization component 1024 may also include point selection logic 1034 to select imagelets from the selected point cloud 1035 of prior sensor information as a basis of comparison with respect to the current image data 1043. The point selection logic 1034 can operate to reduce and/or optimize the number of points (e.g., imagets) which are used with each selected point cloud 1035 of prior sensor information, thereby reducing a number of image comparisons that are performed by the localization component 1024 when determining the localization output 1021. In one implementation, the point selection logic 1034 implements point selection rules 1055. The point selection rules 1055 can be based on contextual information, such as the weather, time of day, or season. The point selection rules 1055 can also be specific to the type of sensor data. For passive image data, the point selection rules 1055 can exclude or de-prioritize imagelets which depict non-vertical surfaces, such as rooflines or horizontal surfaces, since precipitation, snow and debris can affect the appearance of such surfaces. Under the same weather conditions, the point selection rules 1055 can also prioritize imagelets which depict vertical surfaces, such as walls, or signs, as such surfaces tend to preclude accumulation of snow or debris. Still further, the point selection rules 1055 can exclude imagelets or portions thereof which depict white when weather conditions include presence of snow.

Likewise, when Lidar is used, the point selection rules 1055 may select surfaces that minimize the effects of rain or snow, such as vertical surfaces. Additionally, the point selection rules 1055 may avoid or under-weight surfaces which may be deemed reflective.

The localization component 1024 may use image processing logic 1038 to compare image data 1043 of the current sensor state 493 against the imagelets of the selected point cloud 1035 in order to determine objects and features which can form the basis of geometric and spatial comparison. A perceived geometric and/or spatial differential may be determined between objects and/or object features of image data 1043 and imagelets of the selected point cloud 1035. The perceived differential may reflect a difference in the location of capture, as between sensor devices (e.g., on-board cameras of the vehicle 10) used to capture the current image data 1043 and the imagelets of the point cloud 1035, representing the prior sensor information. Similarly, the perceived geometric differential may reflect a difference in a geometric attribute (e.g., height, width, footprint or shape) of an object or feature that is depicted in the current image data 1043, as compared to the depiction of the object or feature with the corresponding imagelet of the point cloud 1035.

The localization component 1024 may include geometric/spatial determination logic 1036 to convert the perceived geometric and/or spatial differential into a real-world distance measurement, reflecting a separation distance between the location of capture of the current image data 1043 and the location of capture of imagelets of the selected point cloud 1035. As an addition or variation, the geometric/spatial determination logic 1036 may convert the perceived geometric and/or spatial differential into a real-world pose or orientation differential as between the image capturing devices of the current image data 1043 and sensor devices uses to capture the imagelets of the selected point cloud 1035. In some examples, the geometric/spatial determination logic 1036 manipulates the perceived object or feature of the current image data 1043 so that it matches the shape and/or position of the object or feature as depicted in imagelets of the selected point cloud 1035. The manipulation may be used to obtain the values by which the perceived object or feature, as depicted by the current image data 1043, differs from the previously captured image of the object or feature. For example, the perceived object or feature which serves as the point of comparison with imagelets of the selected point cloud 1035 may be warped (e.g., enlarged), so that the warped image of object or feature depicted by the current image data 1043 can overlay the image of the object or feature as depicted by the imagelets of the selected point cloud 1035.

The perception component 1022 may determine a perception output 1025 using the current sensor state 493 and prior sensor state 1029. As described with examples, the perception output 1025 may include (i) identification of image data corresponding to static objects detected from current image data, or (ii) identification of image data corresponding to non-static objects detected from current image data. In some examples, the perception output 1025 may also include tracking information 1013, indicating past and/or predicted movement of a non-static object.

In some examples, the prior sensor state 1029 may include a static object feature set 1037, which includes data sets captured previously which are deemed to depict static objects in the area of the road segment. The static objects include permanent objects which are not likely to change location or appearance over a duration of time. By way of example, the static objects may include objects which are deemed to have a height, shape, footprint, and/or visibility that is unchanged over a significant amount of time (e.g., months or years). Thus, for example, the static objects represented by the static object feature set 1037 may include buildings and roadway structures (e.g., fences, overpasses, dividers etc.).

According to some examples, the perception component 1022 uses the static object feature set 1037 to identify portions of the current image data 1043 which reflect the presence of the static objects. In some examples, the perception component 1022 may utilize the image processing logic 1038 to implement image recognition or detection of the static object feature depicted by the current image data 1043, using the identified static object feature set 1037 provided by the prior sensor state 1029. For example, the static object feature set 1037 may specify semantic information (e.g., object classification, shape) about a static object, as well as a relative location of the static object by pixel location or image area. The perception component 1022 may use the image processing component 1038 to detect and classify objects in relative regions of the scene being analyzed, in order to determine if a semantically described static object is present in that image data corresponding to that portion of the scene. In this way, the perception component 1022 may then uses the image processing logic 1038 to detect the static object from the current image data 1043, using the pixel location or image area identified by prior sensor state 1029, as well as the object shape and/or classification.

Once the static objects are detected from the current image data 1043, the perception component 1022 may then deduce other objects depicted by the current image data 1043 as being non-static or dynamic. Additionally, the perception component 1022 may detect a non-static object as occluding a known static object when the image analysis 1038 determines that the pixel location/image area identified for the static object feature set 1037 does not depict an object or feature of that set. When the perception component 1022 determines static objects from the current sensor state 493, the perception component 1022 may implement object subtraction 1026 so that the presence of the static object is ignored in connection with one or more sensor analysis processes which may be performed by the sensor processing subsystem 1000. For example, the sensor processing subsystem 1000 may subsequently perform event detection to track objects which are non-static or dynamic. When pixel data corresponding to static objects are ignored or removed, subsequent processes such as event detection and tracking may be improved in that such processes quickly focus image processing on non-static objects that are of interest.

In some examples, the perception component 1022 may include tracking logic 1014 which operates to track non-static objects, once such objects are identified. For example, non-static objects may be sampled for position information over time (e.g., duration for less than a second). To optimize processing, the perception component 1022 may ignore static objects, and focus only on the non-static object(s) during a sampling period. This enables the autonomous vehicle 10 to reduce the amount of computation resources needed to track numerous objects which are encountered routinely when vehicles are operated. Moreover, the vehicle can optimize response time for when a tracked object is a potential collision hazard.

In some examples, the tracking logic 1014 calculated a trajectory of the non-static object. The calculated trajectory can include predicted portions. In some examples, the trajectory can identify, for example, one or more likely paths of the non-static object. Alternatively, the tracking logic 1014 may calculate a worst-case predictive trajectory for a non-static object. For example, the tracking logic 1014 may calculate a linear path as between a current location of a tracked non-static object, and a path of the vehicle, in order to determine a time, orientation or velocity of the object for collision to occur. The tracking logic 1014 may perform the calculations and resample for the position of the non-static object to see re-evaluate whether the worst-case scenario may be fulfilled. In the context of AV control system 400, the perception output 1025 (shown in FIG. 4 as perception 423)

As illustrated by examples of FIG. 10, image analysis 1038 includes operations which can be performed to determine localization output 1021 and/or perception output 1025. The image analysis 1038, when applied to either localization component 1024 or perception component 1022, may include rules or logic to optimize or otherwise improve accuracy and/or ease of analysis. In some examples, the image processing 1038 includes warping logic 1063, which includes rules or models to alter or skew dimensions of detected objects. In context of perception component 1022, a detected image provided by current image data 1043 may be enlarged or skewed in order to determine whether the object appears to match any of the static objects 1037 which the prior sensor state 1029 indicates should be present. In variations, the static objects 1037 may be identified by semantic labels, and the image processing component 1038 can first warp a detected object from the current image data 1043, and then classify the detected object to determine if it matches the semantic label provided as the static object 1037. In the context of localization, the warping logic 1063 can warp detected objects in the current image data 1043 and/or prior sensor state 1029 in order to determine if a match exists as to specific features or sub-features of the detected object.

Additional examples recognize that with respect to passive image sensor data, the image analysis 1038 may be negatively affected by lighting conditions, or environmental conditions which may impact the appearance of objects. Thus, for example, an outcome of image analysis 1038 may affect the accuracy of efficiency of the geometric/spatial determination 1036, in that lighting variations may features depicted by the current image data 1043 may be more or less likely to match with corresponding features depicted by the point cloud of imagelets, based on lighting factors.

According to some examples, the sensor processing subsystem 1000 may include time and/or place shift transformations 1065 for use in comparing passive image data. The shift transformations 1065 may be applied by, for example, the image processing logic 1038, when image processing is performed in context of either localization component 1024 or perception component 1022. Each transformation 1065 can represent a visual alteration to at least a portion of the current image data 1043 and/or prior image data. In some examples, the transformations can be quantitative variations that are applied globally to image data from a particular scene, or alternatively, to a portion of image data captured from a scene. The individual transformations can alter the appearance of passive image data sets (either current or prior sensor sets) with respect to attributes such as hue, brightness and/or contrast. The image processing 1038 may apply the transformations selectively, when, for example, a disparity exists between current and past image sets with respect to hue, brightness, or contrast. Examples recognize that such disparity may be the result of, for example, variation in time of day (e.g., vehicle currently driving on road segment at night when sensor information was previously captured during day time hours), or change in season (e.g., vehicle currently driving on road segment during winter while sensor information was previously captured during summer). In the case of passive image data, the disparity in hue, brightness or contrast can impact the ability of the image processing component 1038 to accurately perform recognition, thus, for example, hindering the ability of the vehicle to perform localization or perception operations.

According to some examples, the image processing component 1038 may selectively use the shift transformations 1065 to better match the current and past image data sets for purpose of comparison and recognition. For example, the image processing component 1038 may detect disparity in lighting condition between the current image data 1043 and the image data provided by the prior sensor state 1029, independent of image recognition and/or analysis processes. When such disparity is detected, the sensor processing subsystem 1000 may select a transformation, which can be applied similar to a filter, to accurately alter the current image data 1043 in a manner that best approximates visual attributes of the image data contained with the prior sensor state 1029.

Examples also recognize that in a given geographic region, some roads or portions of the road network will have less sensor data sets as a result of being less traveled than other roads which may carry more traffic. Moreover, roads and road segments may provide substantial variation as to lighting parameters, given environmental factors such as presence of trees, buildings and street lights. To account for such variations, the shift transformations 1065 can transform the current image data 1043 based on a categorization scheme, such as categories for tree coverage, building coverage, and poor street lighting. For a given road segment, in some implementations, the transformations 1065 may be selected for segments of roads based on road type (e.g., heavy trees, buildings, absence of street lights). In variations, the transformations 1065 may be based on prior sensor state data 1029 of adjacent or nearby road segments, captured under environmental/lighting conditions that sufficiently match a current condition of the vehicle 10 traveling along a less traveled road segment.

Figure 11:
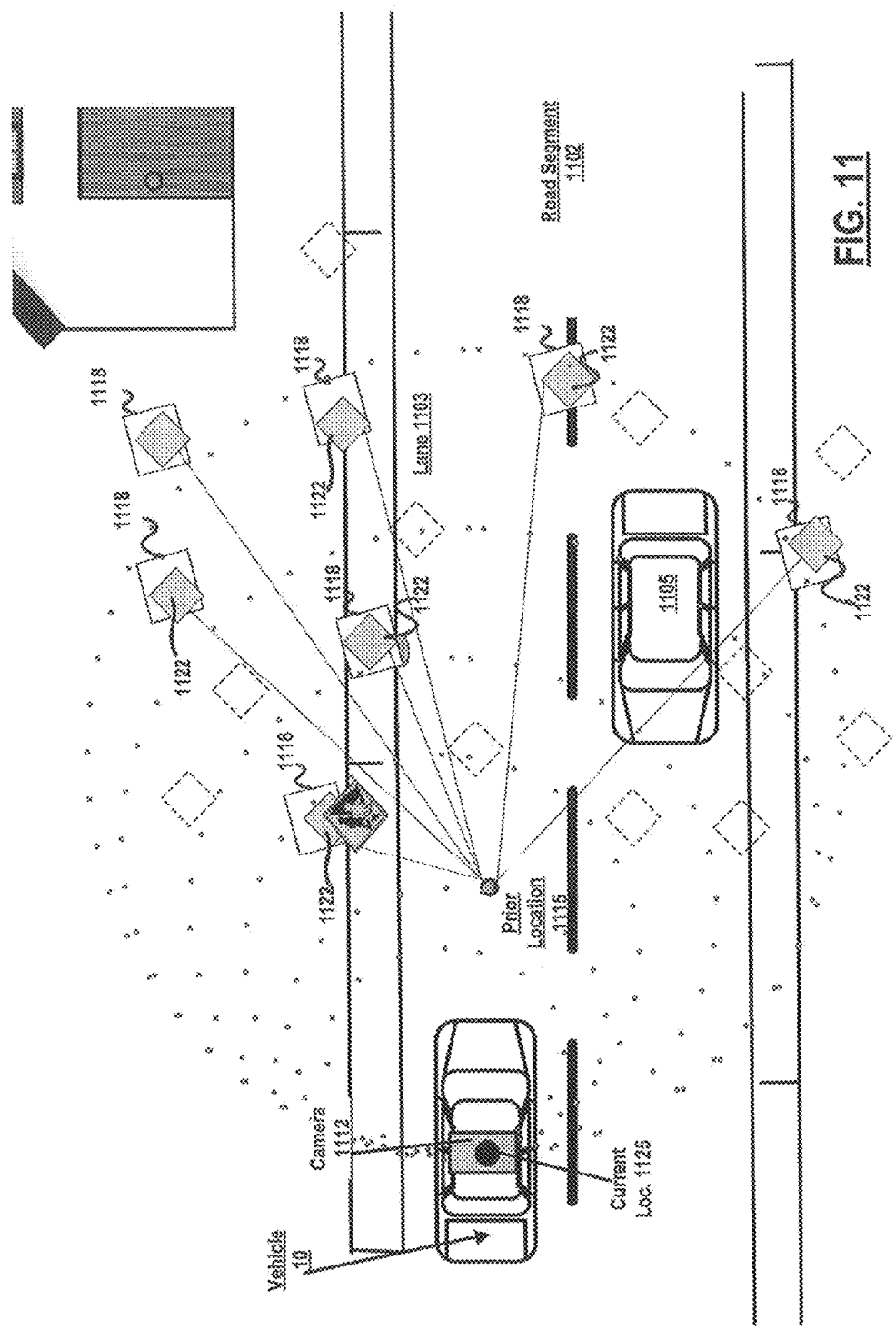
FIG. 11 illustrates an example of a vehicle on which an example of FIG. 10 is implemented.

FIG. 11 illustrates an example of a vehicle on which an example of FIG. 10 is implemented. A vehicle 10 may operate autonomously, meaning the vehicle can drive on a route and navigate without human control or input. The vehicle 10 can implement, for example, the AV control system 400, in order to autonomously navigate on a road network of a given geographic region. In an example of FIG. 11, the vehicle 10 is shown to traverse a road segment 1102, using a given driving lane 1103, and furthermore in presence of dynamic objects such as other vehicles 1105 and people.

In an example of FIG. 11, the vehicle 10 implements the sensor processing subsystem 1000 as part of the AV control system 400 in order to determine the localization output 121 and the perception output 129. Thus, the sensor processing subsystem 1000 can be implemented as part of SIPS 100, and further as part of the AV control system 400 of the autonomous vehicle 10. The vehicle 10 may include sensor devices, such as a camera set 1112, shown as a rooftop camera mount, to capture images of a surrounding scene while the vehicle travels down the road segment 1102. The camera set 1112 may include, for example, stereoscopic camera pairs to capture depth images of the road segment. In the example shown, the sensor processing subsystem 1000 may be implemented using processors that are located in, for example, a trunk of the vehicle 10.

In an example, the sensor processing subsystem 1000 can select a point cloud of imagelets 1122 which represent the prior sensor state captured for the road segment 1102. The imagelets 1122 may include raw image data (e.g., pixel images), processed image data (e.g., feature vector of select objects), semantic labels, markers and image data of a particular region of the scene about a prior location of capture 1115, where the prior location of capture 1115 has a precisely known location. The sensor processing subsystem 1000 can take current sensor state data, including image data captured by the camera set 1112, and fan the current image data about two or three dimensions. In this way, the current image data can be structured or otherwise identified as image segments 1118, which can be compared to prior state imagelets 1122 of the selected point. The comparison can calculate the difference between the current location of capture 1125 for the current image segments 1118 the prior location of capture 1115 for the prior imagelets 1122. From the comparison, the vehicle 10 can determine the localization output 121, 1021, including a localization coordinate 1017 and pose 1019, each of which may be made in reference to the prior location of capture 1115.

Figure 12:
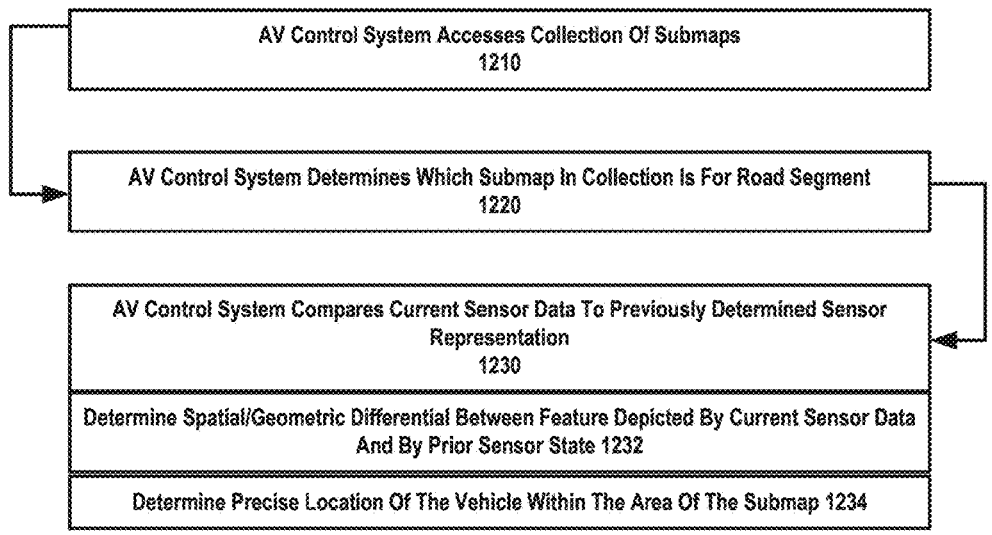
FIG. 12 illustrates an example method for determining a location of a vehicle in motion using vehicle sensor data, according to an embodiment.
Figure 13:
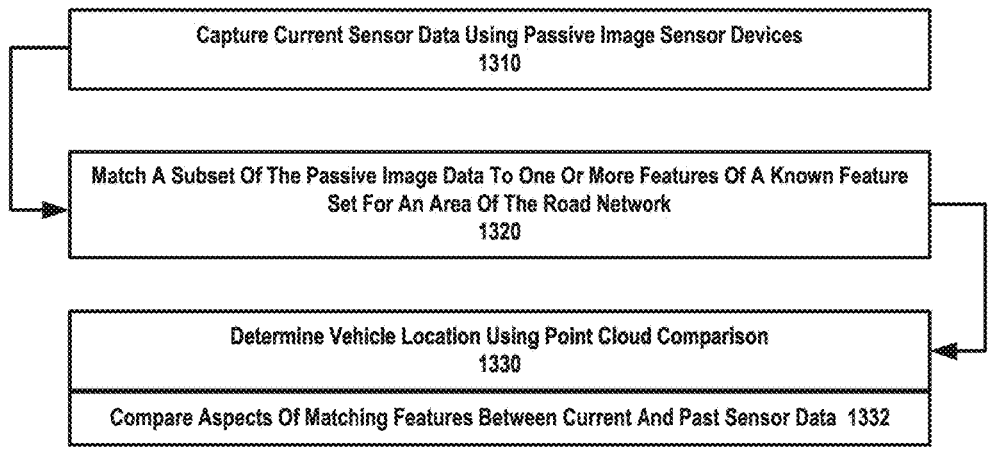
FIG. 13 illustrates a method for determining a location of a vehicle in motion using image data captured by the vehicle, according to an embodiment.
Figure 14:
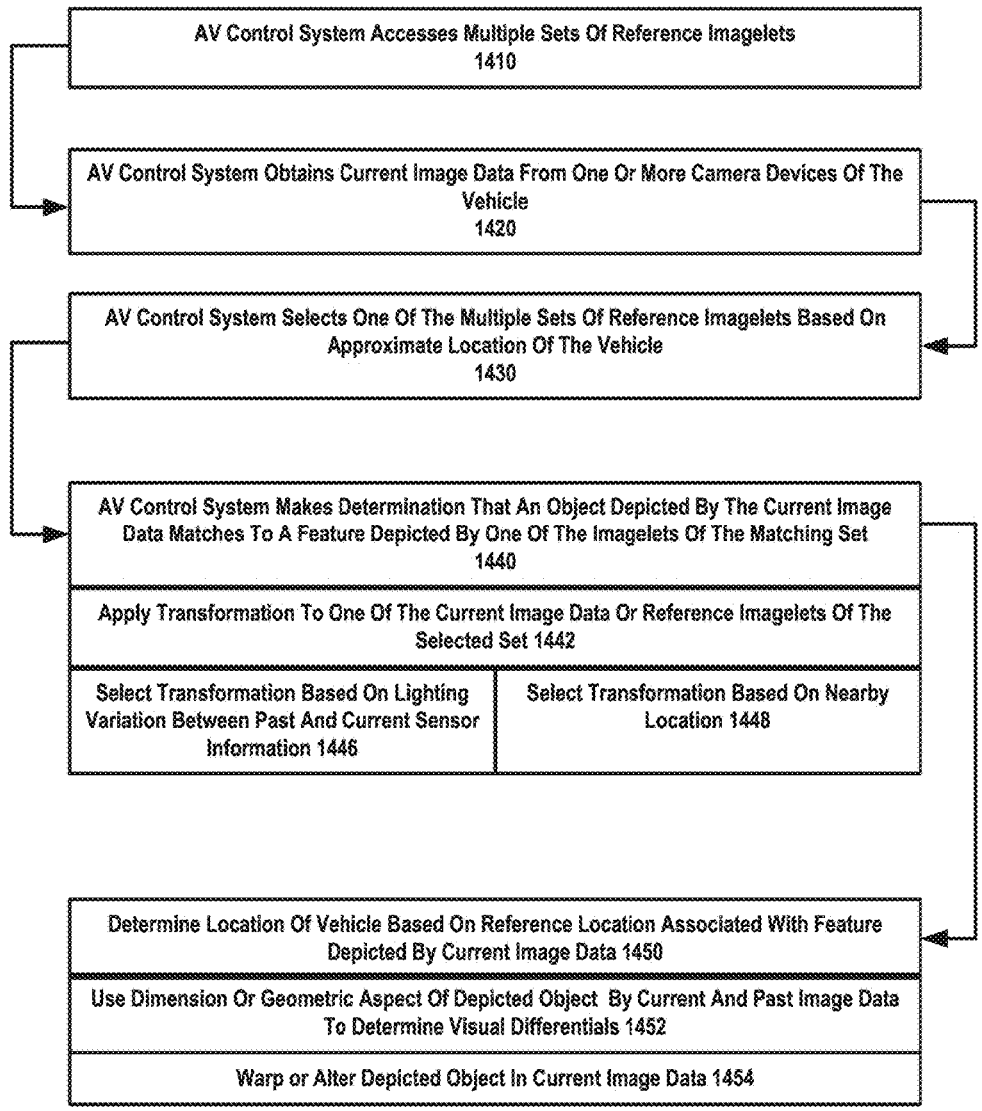
FIG. 14 illustrates a method for determining a location of a vehicle in motion using an image point cloud and image data captured by the vehicle, according to an embodiment.
Figure 15:
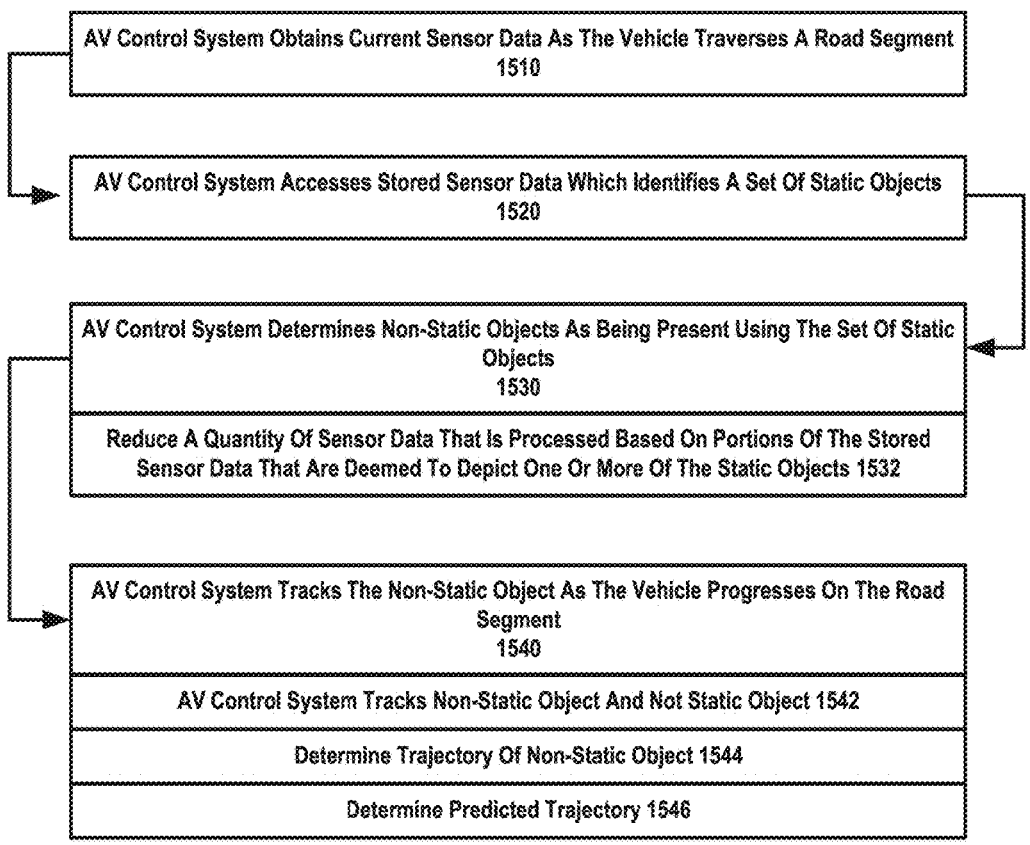
FIG. 15 illustrates an example method in which the perception output is used by a vehicle to process a scene.

FIG. 12 illustrates an example method for determining a location of a vehicle in motion using vehicle sensor data, according to an embodiment. FIG. 13 illustrates a method for determining a location of a vehicle in motion using image data captured by the vehicle, according to an embodiment. FIG. 14 illustrates a method for determining a location of a vehicle in motion using an image point cloud and image data captured by the vehicle, according to an embodiment. FIG. 15 illustrates an example method in which the perception output is used by a vehicle to process a scene. Example methods such as described with FIG. 12 through FIG. 15 may be implemented using components and systems such as described with other examples. In particular, examples of FIG. 12 through FIG. 15 are described in context of being implemented by the AV control system 400, which may include or implement the sensor processing subsystem 1000. Accordingly, reference may be made to elements described with other figures for purpose of illustrating suitable components for performing a step or sub-step being described.

With reference to an example of FIG. 12, a collection of submaps may be accessed by the AV control system 400 of the vehicle in motion (1210). The collection of submaps may be locally accessed and/or retrieved over a network from a remote source (e.g., network service 200). Each submap of the collection may include or be associated with prior sensor state data 1029 corresponding to sensor data and/or sensor-based determinations of static features for a given road segment. The features may include static objects that may be visible to sensors of a vehicle (e.g., landmarks, structures in view of a vehicle on the roadway), roadway features, signage, and/or traffic lights and signs. The features may be stored as data sets that are associated or provided with a data structure of a corresponding submap. Each data set may, for example, include a sensor-based signature or feature vector representation of a portion of a scene, as viewed by a specific type of sensor set (e.g., stereoscopic camera, Lidar, radar, sonar, etc.). Furthermore, the stored sensor data sets may be associated with a reference location of the submap, such as the location of the vehicle when the prior sensor data sets were captured. One or multiple types of sensor data sets may be provided with the prior sensor state data 1029 of the submap. For example, the prior sensor state 1029 of a submap may include two-dimensional image data, stereoscopic image pair data, Lidar, depth image, radar and/or sonar, as captured from a particular location of a road network.

In some examples, the feature set associated with the collection of submaps are developed over time, using the sensor components (e.g., camera set 1112) of the same vehicle 1110 in prior passes of the road segment. In variations, the vehicle in 1110 is part of a larger number of vehicles, each of which record sensor data and/or feature sets of the same sensor type(s). As described with an example of FIG. 2, the submap network service 200 may collect and process the sensor data from individual vehicles of a fleet, and then share the submaps with updated feature sets with other vehicles of the fleet.

At an initial time, the AV control system 400 may determine which submap in a collection of submaps is for the particular road segment on which the vehicle 1110 is operated (1220). The determination may be made when, for example, the vehicle is started, switched into autonomous mode, or when the vehicle resets or re-determines its position for a particular reason. In some examples, the AV control system 400 may approximate the current location of the vehicle 1110 using a satellite navigation component and/or historical information (e.g., information from a prior trip).

The AV control system 400 performs localization by determining a location of the vehicle within the determined submap. In particular, the localization may be performed by comparing current sensor data (e.g., current image data 1043) to a previously determined sensor representation (e.g., sensor state 1029) of the region surrounding the current road segment, where each of the current sensor data and the prior sensor data are associated with a particular location of capture (1230). In an implementation, the selected submap may include or otherwise identify the prior sensor information, as well as provide a prior location of capture within the submap, and the AV control system 400 may compare current and past sensor information in order to determine an accurate and highly granular (e.g., within 1 foot) location of the vehicle within the submap. In some examples, the determined location may be relative to a boundary or reference location of the submap, and further may be based on a known location of capture for the prior sensor information.

In some examples, the submap carries additional determinations pertaining to the prior sensor state 1029, such as the distance of the vehicle from the sidewalk. The additional determinations may provide further context and mapping with respect to understanding the current location of the vehicle in the submap. For example, the determined location may be highly granular, specifying, for example, the lane the vehicle 1110 occupies, and a distance of the vehicle from, for example, an edge of the roadway. Still further, in some examples, the location of the vehicle 10 may be specific to, for example, a width of a tire.

According to some examples, the AV control system 400 compares features of the scene surrounding the vehicle 1110, as provided by current sensor data, to features of the prior sensor state 1029, in order to determine a depicted spatial or geometric differential between the feature as depicted by the current sensor data and the same feature as depicted by the prior sensor state (1232). For example, the image processing component 1038 may recognize a given feature from current image data (e.g., Lidar image, sonar image, depth image, etc.) but the given feature as recognized from the current image data may vary in dimension (e.g., shape, footprint), spacing (e.g., relative to another object), and/or orientation as compared to the depiction of the feature with the prior sensor state data 1029 of the submap. The identified differential between the respective depictions may be correlative to a spatial difference between the current location of capture for the vehicle 1110 and the prior location of capture associated with the sensor information of the submap. The determined spatial difference may identify a precise location of the vehicle within the area of the submap (1234).

As described with examples of FIG. 13 and FIG. 14, the feature set of the current submap may be implemented in the form of a point cloud structure of sensor data sets, where individual features of the current submap are associated with a precise location. The current sensor data set may be analyzed to determine sensor data sets which match to point cloud elements of the point cloud. Based on the comparison, the location of the vehicle may be determined in reference to the precise location of point cloud elements which form the basis of the comparison.

In FIG. 13, the AV control system 400 employs passive image sensors in connection with prior sensor state information that is structured in the form of a point cloud. A set of current sensor data may be captured by passive image sensor devices of the vehicle 10 instance when the vehicle traverses a given area of the road network (1310). The passive image sensor devices may correspond to, for example, one or more pairs of stereoscopic cameras of an autonomous vehicle 10.

The AV control system 400 may match a subset of the passive image data to one or more features of a known feature set for an area of the road network (1320). The known feature sets may be in the form of image-based sensor data sets, such as feature vectors or image signatures of one or more static objects which are known to be visible in the area of the vehicle's location. The known features, depicted with the image-based sensor data sets, may be associated with a precise location. While some examples such as described with an example of FIG. 11 utilize submap data structures to carry feature sets which provide a basis for comparison to current sensor state information, in variations, other data structure environments may be used by the vehicle to maintain and use features for comparing passive image data to corresponding image reference data. For example, the known features may be associated with a precise distance and orientation with respect to a roadway landmark (e.g., the end of an intersection). In examples in which submaps are used, the known features may be associated with a precise location within the submap.

The AV control system 400 may determine the location of the vehicle within the given area based on the comparison of the current sensor state 493, which may be in the form of passive image data, and the known features which are structured in a point cloud and associated with a known reference location (1330). In one implementation, aspects of features detected from the current sensor state 493 are compared to corresponding aspects of the matched and known feature set. One or more variations are determined with respect to dimension and pose, as between the aspects of the features provided in the current sensor data and corresponding aspects of the matched feature set (1332). The variations may be converted into position and pose variation with respect to the reference location of the reference images.

With regard to FIG. 14, the AV control system 400 may access multiple sets of reference imagelets (e.g., a plurality of point clouds) which depict known features of the area of the road network for the vehicle's current location (1410). Each of the reference imagelet sets may depict a feature that is associated with a reference location, identifying, for example, a location of a camera where the set of imagelets were previously captured.

While the vehicle traverses a road segment, the AV control system 400 obtains current image data from one or more camera devices of the vehicle (1420). As the vehicle traverses the road network, the AV control system 400 may also associate an approximate location with the current image data. The approximate location may be determined by, for example, a satellite navigation component and/or historical information which tracks or records the location of the vehicle.

For the given location, the AV control system 400 selects one of the multiple sets of reference imagelets, based at least in part on the approximate location of the vehicle (1430). As an addition or variation, the vehicle may have alternative point cloud representations to select from for a given reference location, with the alternative point cloud representations representing alternative lighting conditions (e.g., seasonal, from weather, time of day, etc.).

Additionally, the AV control system 400 makes a determination that an object depicted by the current image data matches to a feature depicted by one of the imagelets of the matching set (1440). For example, individual imagelets of the selected reference imagelet set may be compared to portions of the current image data in order to determine the presence of a matching object or object feature. In some examples, the AV control system 400 may utilize rules, models or other logic to optimize the use of point cloud imagelets for purpose of determining location. In one aspect, a set of selection rules may be utilized to identify imagelets of the known feature set to either use or ignore when performing the comparison to the current sensor state. The selection rules may be based in part on context, such as time of day, weather condition, and/or lighting conditions. For example, the selection rules may disregard imagelets that depict vertical surfaces when there is snow.

In making the determination, the AV control system 400 applies a transformation on one of the current image data or the reference imagelets of the selected set (1442). The AV control system 400 may apply the transformation based on a determination that a variation of a lighting condition is present as between the area of the road network when the reference set of imagelets were captured and when the current image data is captured (1444). The condition may be of a type which affects an appearance of objects and/or the surrounding area. In some examples, the condition may be one that affects a lighting of the area surrounding the road network, such as the time of day (e.g., variation in image as captured during daytime, dusk or evening) or weather (e.g., cloudless sky versus heavy inclement weather).

According to some examples, the transformation may be determined from a criteria or model that is trained using sensor data previously collected from the current vehicle and/or one or more other vehicles at the approximate location (1446). In variations, the transformation may be determined from a model that is trained using sensor data previously collected from the current vehicle and/or one or more other vehicles at a neighboring location (1448). The neighboring location may be, for example, on the same road (e.g., on an alternative region of the road where more sensor data exists), on an adjacent road (e.g., on a neighboring road where the condition is deemed to have a similar affect), or on a same type of road (e.g., road darkened by trees).

The AV control system 400 determines a highly granular location of the vehicle 10 based at least in part on the reference location associated with the feature depicted by the current image data (1450). In some examples, a dimensional or geometric aspect of the object is compared to a corresponding dimension or geometric aspect of the object depicted by the reference imagelets in order to determine one or more visual differentials (1452). In variations, the object depicted by the current image data is altered or warped to provide the differential in dimension, orientation or other geometric characteristic until the object depicted by the current image data matches that of the reference image (1454). The differential(s) may be mapped or translated into a difference in distance and orientation with respect to the reference location of the reference imagelet where the corresponding feature is depicted.

With reference to FIG. 15, a vehicle is autonomously operated to travel across the road segment using, for example, AV control system 400, including the AV control system 400. The vehicle 1110 may obtain current sensor data as the vehicle traverses a road segment (1510). The current sensor data may include image data, such as captured by two-dimensional cameras, or by pairs of stereoscopic cameras that capture three-dimensional images of a corresponding scene. In variations, the sensor data may include Lidar or radar images.

In traversing the road segment, the vehicle 1110 may access stored sensor data which identifies a set of static objects (1520). The set of static objects are identified by the vehicle based on vehicle location. In some implementations, the vehicle may have a granular awareness of its own location, using for example, a satellite navigation component, or a general determination made from historical data or from a particular submap in use.

In variations, the stored sensor data that identifies the static objects may reside with a submap that identifies the precise location of each static object relative to the submap. For example, the vehicle may utilize the stored submaps to concurrently perform localization so that the vehicle's current location within the road segment is known. Additionally, the submap may identify the location of static objects in relation to a reference frame of the submap. In such examples, the vehicle may facilitate its ability to identify stored data that depicts those static objects which are most likely present and depicted by the current sensor state 493 of the vehicle 1110.

The vehicle 1110 may determine one or more non-static (or dynamic) objects as being present in a vicinity of the vehicle based on the current sensor data and the stored sensor data (1530).

In determining one or more non-static objects as being present, the AV control system 400 may reduce a quantity of sensor data that is processed based on portions of the stored sensor data that are deemed to depict one or more of the static objects (1532). For example, the AV control system 400 may subtract portions of the current image data which are deemed to depict any one or more of the set of static objects. In determining portions of the current sensor data which depict static objects, the AV control system 400 may implement image analyses in order to recognize or detect the static objects of the stored sensor data which are likely depicted by the current sensor data.

According to some examples, once the AV control system 400 determines that a non-static object is present in a vicinity of the vehicle, the AV control system 400 tracks the non-static object as the vehicle progresses on the road segment (1540). Depending on implementation, the vehicle may track the non-static object using any one or combination of sensors, including cameras, Lidar, radar or sonar.

In some examples, the AV control system 400 may track the non-static object without tracking any of the determined static objects (1542). For example, the AV control system 400 may identify portions of an overall pixel map which are likely to depict static objects. The AV control system 400 may then ignore portions of the current image data which map to the identified portions of the pixel map which depict static objects.

The AV control system 400 may track the non-static object by determining a trajectory of the object (1544). The trajectory determination can include sampling for the position of the non-static object for a short duration of time, while ignoring the static objects. The trajectory determination may include a predicted trajectory of the object (1546), based on probability or worst-case scenario.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for performing localization for a vehicle in motion, the method being implemented by one or more processors and comprising:

accessing a collection of imagelets for a geographic region that encompasses multiple predefined areas of a road network, each imagelet depicting at least one feature present in a corresponding area of the multiple predefined areas, wherein each imagelet is stored with reference location information identifying a reference location of a prior sensor device determined when the prior sensor device captured prior sensor data for the imagelet;

obtaining current sensor data from one or more sensor devices of the vehicle, the current sensor data including (i) image data captured by one or more cameras of the vehicle, (ii) data that identifies a current location of the vehicle, and (iii) data that identifies current environmental conditions;

selecting a set of imagelets from the collection of imagelets based at least in part on the current location of the vehicle;

for at least one imagelet in the selected set of imagelets, upon detecting a disparity between the current environmental conditions and prior environmental conditions that were present when the prior sensor data for the at least one imagelet was captured, applying a transformation to at least one of the image data or the at least one imagelet to account for the disparity;

matching, to the image data, one of the features depicted in the at least one imagelet of the selected set of imagelets; and updating the current location for a control system of the vehicle based at least in part on the reference location of the prior sensor device that captured the prior sensor data for the at least one imagelet.

2. The method of claim 1, wherein accessing the collection of imagelets includes accessing a collection of submaps for the geographic region, each submap corresponding to an area of the geographic region, wherein each of the submaps of the collection include one or more of the imagelets of the collection of imagelets.

3. The method of claim 2, wherein each submap includes at least one data layer that provides a pointcloud of imagelets captured by a sensor device that previously traversed the area of that submap.

4. The method of claim 2, wherein selecting the set of one or more imagelets includes selecting a subset of imagelets provided with one or more pointclouds of imagelets in an individual submap of the collection of submaps.

5. The method of claim 1, wherein the current environmental conditions and the prior environmental conditions include lighting conditions.

6. The method of claim 1, wherein the current environmental conditions and the prior environmental conditions include variance in a time of day, a day of season, or weather condition.

7. The method of claim 1, wherein applying the transformation includes determining a model for the transformation and applying the transformation based on the model, wherein the model is trained on sets of prior sensor data previously collected from one or more vehicles that obtained the sets of prior sensor data at the current location of the vehicle.

8. The method of claim 1, wherein applying the transformation includes determining a model for the transformation and applying the transformation based on the model, wherein the model is trained on sets of prior sensor data previously collected from one or more vehicles that obtained the sets of prior sensor data on a road or sub-region that contains the current location of the vehicle.

9. The method of claim 1, wherein applying the transformation includes determining a model for the transformation and applying the transformation based on the model, wherein the model is trained on sets of prior sensor data previously collected from one or more vehicles that obtained the sets of prior sensor data on a different road than the road that includes the current location of the vehicle.

10. The method of claim 9, wherein the different road is intersecting or adjacent to the road that includes the current location of the vehicle.

11. The method of claim 1, further comprising determining an orientation of the vehicle relative to a direction of travel as the vehicle progresses through a given area.

12. The method of claim 1, wherein updating the current location of the vehicle includes determining a lane or lateral position of the vehicle on a road segment.

13. A computer system comprising:
a memory to store a set of instructions;
one or more processors to use the set of instructions to:
    access a collection of imagelets for a geographic region that encompasses multiple predefined areas of a road network, each imagelet depicting at least one feature present in a corresponding area of the multiple predefined areas, wherein each imagelet is stored with reference location information identifying a reference location of a prior sensor device determined when the prior sensor device captured prior sensor data for the imagelet;
    obtain current sensor data from one or more sensor devices of a vehicle, the current sensor data including (i) image data captured by one or more cameras of the vehicle, (ii) data that identifies a current location of the vehicle, and (iii) data that identifies current environmental conditions;
    select a set of imagelets from the collection of imagelets based at least in part on the current location of the vehicle;
    for at least one imagelet in the selected set of imagelets, upon detecting a disparity between the current environmental conditions and prior environmental conditions that were present when the prior sensor data for the at least one imagelet was captured, apply a transformation to at least one of the image data or the at least one imagelet to account for the disparity;
    match, to the image data, one of the features depicted in the at least one imagelet of the selected set of imagelets; and
    update the current location for a control system of the vehicle based at least in part on the reference location of the prior sensor device that captured the prior sensor data for the at least one imagelet.

14. The computer system of claim 13, wherein the vehicle is an autonomous vehicle, and the computer system is provided on the autonomous vehicle.

15. The computer system of claim 13, wherein the vehicle is an autonomous vehicle, and the computer system communicates with the autonomous vehicle over a network.

* * * * *